(12) United States Patent
Morikawa et al.

(10) Patent No.: US 6,835,688 B2
(45) Date of Patent: Dec. 28, 2004

(54) PHOTOCATALYTIC MATERIAL, PHOTOCATALYST, PHOTOCATALYTIC ARTICLE, AND METHOD FOR THE PREPARATION THEREOF

(75) Inventors: Takeshi Morikawa, Aichi-gun (JP); Ryoji Asahi, Aichi-gun (JP); Takeshi Ohwaki, Aichi-gun (JP); Yasunori Taga, Aichi-gun (JP)

(73) Assignee: Kabushiki Kaisha Toyota Chuo Kenkyusho, Aichi-gun (JP)

( * ) Notice: Subject to any disclaimer, the term of this patent is extended or adjusted under 35 U.S.C. 154(b) by 240 days.

(21) Appl. No.: 10/062,413

(22) Filed: Feb. 5, 2002

(65) Prior Publication Data

US 2002/0169076 A1 Nov. 14, 2002

Related U.S. Application Data

(63) Continuation of application No. PCT/JP00/05247, filed on Aug. 4, 2000.

(30) Foreign Application Priority Data

Aug. 5, 1999 (JP) .......................................... 11-223003
Jan. 27, 2000 (JP) ...................................... 2000-019315

(51) Int. Cl.[7] .............................................. B01J 27/24
(52) U.S. Cl. ..................................... 502/200; 502/350
(58) Field of Search ................................ 502/200, 350

(56) References Cited

U.S. PATENT DOCUMENTS

| | | | | |
|---|---|---|---|---|
| 5,670,247 A | * | 9/1997 | Takaoka et al. | ............. 442/340 |
| 5,670,248 A | | 9/1997 | Lazarov et al. | |
| 5,776,556 A | | 7/1998 | Lazarov et al. | |
| 5,939,201 A | * | 8/1999 | Boire et al. | ................. 428/432 |
| 6,154,311 A | * | 11/2000 | Simmons et al. | ........... 359/359 |
| 6,344,271 B1 | * | 2/2002 | Yadav et al. | ................. 428/402 |

FOREIGN PATENT DOCUMENTS

| | | |
|---|---|---|
| JP | 7-18210 | 1/1995 |
| JP | 8-134630 | 5/1996 |
| JP | 10-152396 | 6/1998 |
| JP | 11-180736 | 7/1999 |
| JP | 11-267519 | 10/1999 |
| JP | 2000-70709 | 3/2000 |
| JP | 2000-103621 | 4/2000 |
| JP | 2000-140636 | 5/2000 |
| JP | 2000-143241 | 5/2000 |
| JP | 2001-72419 | 3/2001 |
| JP | 2001-347162 | 12/2001 |
| JP | 2001-354422 | 12/2001 |
| WO | WO 9732823 A2 * 9/1997 | ........... C03C/17/06 |

OTHER PUBLICATIONS

S. Sato, Chemical Physics Letters, vol. 123, No. 1, 2, pp. 126–128, "Photocatalytic Activity of NO Doped $TiO_2$ in the Visible Light Region", Jan. 3, 1986.

H. Noda, et al., Chemical Society of Japan Report, No. 8, pp. 1084–1090, "Method for Preparing Titanium Oxide (IV) and its Characterization", 1986 (with partial English translation), no month.

Written Reply filed on Apr. 25, 2003 (with English translation).

M. Che, et al., Chemical Physics Letters, vol. 8, No. 1, pp. 45–48, "Nature of Paramagnetic Species Produced by Oxygen Treatment of Titanium Dioxide", Jan. 1, 1971.

* cited by examiner

Primary Examiner—Stanley S. Silverman
Assistant Examiner—Edward M. Johnson
(74) Attorney, Agent, or Firm—Oblon, Spivak, McClelland, Maier & Neustadt, P.C.

(57) ABSTRACT

A photocatalytic material, which exhibits photocatalytic activity when exposed to visible light, the material containing Ti—O—N containing nitrogen in lattices of titanium oxide crystal.

50 Claims, 16 Drawing Sheets

WAVELENGTH DEPENDENCY
OF ABSORBANCE OF THE PHOTOCATALYST

CONTACT ANLE OF WATER AT THE FILM SURFACE

CHARACTERISTICS OF LAMINATED TYPE PHOTOCATALYST

COMPARISON OF DECOMPOSITION PERFORMANCE
OF ORGANIC SUBSTANCE ON THE PHOTOCATALYST

PHOTOCATALYTIC MATERIAL, PHOTOCATALYST, PHOTOCATALYTIC ARTICLE, AND METHOD FOR THE PREPARATION THEREOF

CROSS REFERENCE TO RELATED APPLICATIONS

The present application is a continuation of PCT/JP00/05247 filed Aug. 4, 2000.

BACKGROUND OF THE INVENTION

1. Field of the Invention

The present invention relates to photocatalytic material which is capable of exhibiting photocatalytic activity when irradiated with visible and ultraviolet light, a photocatalyst, a photocatalytic article and a method for the preparation thereof.

2. Description of the Background

Conventionally known materials exhibiting a photocatalytic action include $TiO_2$ (titanium dioxide), CdS (cadmium sulfide), $WO_3$ (tungsten trioxide), and ZnO (zinc oxide), for example. These photocatalytic materials are semiconductors, absorb light to form electrons and holes, and also promote various chemical reactions and bactericidal actions. However, because titanium oxide is nontoxic and exhibits a superior stability to water and acid, thus far, only titanium oxide has afforded practical commercial use as a photocatalyst.

However, because of the values of the band gap (Eg=3.2 eV) of titanium oxide the operating light of such a titanium oxide photocatalyst is limited to ultraviolet light with a wavelength $\lambda<380$ nm. As a consequence, an unfulfilled demand exits for materials which exhibit catalytic activity when irradiated with visible light having a wavelength of 380 nm or longer. These materials are desired, for example, for use indoors and for improving photocatalytic activity.

As described in Japanese Patent Laid-Open publication No. Hei 9-262482, by modifying materials using ion implanting of metal elements such as Cr (chromium) and V (vanadium) in anatase type titanium oxide having a high catalytic activity, the light absorbing edge of titanium oxide can be shifted to the long wavelength side to permit the operation of titanium oxide catalyst in visible light. Although a number of reports discussing the doping of Cr, and V, for example, on have been published since the early 1970s, these reports describe, however, that in instances where operation under visible light is enabled, the performance of the titanium oxide sharply lowers.

On the other hand, as described in Japanese Patent Laid-Open publication No. Hei 9-262482, the original performance of titanium oxide can be maintained through use of special techniques for doping Cr, and V, for example.

Thus, in the above conventional example, the operation of titanium oxide photocatalyst under visible light is made possible by ion implantation of metal elements in titanium oxide. However, metal ion implantation is disadvantageous because of the high cost thereof. While there is a demand for other methods of manufacturing and synthesizing of $TiO_2$ photocatalyst, such as synthesis in solution or sputtering, photocatalysts produced through these methods still can not operate under visible light. It is generally considered that this is because Cr of the dopant aggregates or forms oxides, such as $Cr_2O_3$, in a crystallization process. Thus, the technique of ion implantation must be adapted in order for metal elements to be used to enable the operability of titanium oxide under visible light. Unfortunately, this method entails an expensive large-scale apparatus and a very high manufacturing cost. While attempts have been made to realize visible light operation by doping trivalent elements, the optimum state of such doping has not yet been realized.

Furthermore, Japanese Patent Laid-Open publication No. 2000-140636 opened to the public after the filing of the two applications from which the present application claims priority, discloses a method of forming a photocatalytic substance by doping trivalent elements in titanium oxide and that one of aluminum, boron, and nitrogen is used as the trivalent element. The example given in this publication describes that acetaldehyde may be decomposed more efficiently in a powder body in which titanium oxide and its nitrogen dope body are laminated in many layers, than in a titanium oxide powder, when light is irradiated from a natural light fluorescent lamp. However, the titanium oxide in that example is prepared by doping trivalent elements in which nitrogen is merely doped or unintentionally mixed and the photocatalyst is not constructed so as to maximize photocatalytic activity under visible light. In addition, in the example of that publication wherein a fluorescent lamp is employed, a description of the effects of ultraviolet light radiated by a fluorescent lamp is included. An experimental method employing a fluorescent lamp, even one designated as natural light, is not suitable for evaluating activity under visible light because any observed improvement in photocatalytic activity might be attributed to enhanced UV activity owing to structural changes, such as an increased surface area or the like. Therefore, it is likely that the true photocatalytic activity under visible light of the nitrogen doped body of this titanium oxide is not as great as indicated by the example as the observed increase in photocatalytic activity may be due to enhanced UV activity for the reasons mentioned.

Thus, a need exists for a titanium oxide photocatalyst having visible light absorption, and which can be produced, if desired, without using ion implantation.

SUMMARY OF THE INVENTION

Accordingly, it is an object of the present invention to provide a titanium oxide photocatalyst having visible light adsorption and, moreover, to provide a photocatalyst which has higher visible light absorbing efficiency without using ion implantation.

It is also an object of the present invention to provide a photocatalytic composition.

It is, further, an object of the present invention to provide a photocatalytic article.

The above objects and others are provided by a photocatalytic material, which exhibits photocatalytic activity when exposed to light containing a wavelength in a region of visible light, the material containing Ti—O—N containing nitrogen in lattices of titanium oxide crystal.

DETAILED DESCRIPTION OF THE PREFERRED EMBODIMENTS

Figure 1:
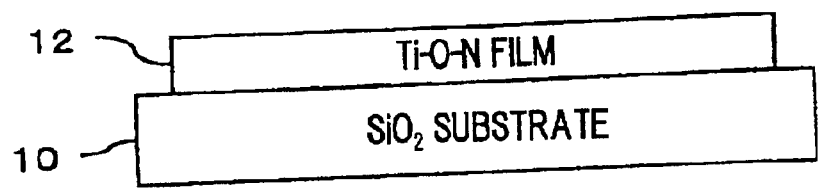
FIG. 1 illustrates the constitution of Embodiment 1 of the present invention.

From experimental analysis and a theoretical study of the optical properties of semiconductors using the first principle calculation, it has now been found that the nitrogen-containing titanium oxide semiconductors of the present invention form new levels within the band gap of titanium oxide. From this realization, a photocatalytic material exhibiting a strong photocatalytic activity under visible light in a wavelength region wider than that of titanium dioxide has been developed by preparing said nitrogen-containing titanium oxide using a particular production method.

The photocatalytic materials according to the present invention have a Ti—O—N constitution in which nitrogen (N) is incorporated in titanium oxide crystal and which exhibit photocatalytic activity similar to titanium oxide when using visible light as an operating light. Moreover, as nitrogen is a very stable and non-toxic material, incorporation of nitrogen will not cause any problems during actual use.

Furthermore, it is acceptable if nitrogen is incorporated in the titanium oxide crystal by either one or a combination of processes entailing substituting a nitrogen atom for an oxygen site of titanium oxide crystal, doping a nitrogen atom within, or at an interstitial site of a lattice of a titanium oxide crystal, or doping a nitrogen atom to grain boundaries of titanium oxide.

In addition, it is desirable if the photocatalytic materials according to the present invention incorporate nitrogen atoms doped in titanium oxide crystal where titanium atoms are chemically bonded to nitrogen atoms.

From the above, a photocatalyst which exhibits photocatalytic activity by absorbing visible light can be obtained. Thus, the present photocatalyst are able to exhibit satisfactory photocatalytic activity even under solar or fluorescent light.

It is known that nitrogen elements can be incorporated into conventional titanium oxide photocatalysts during their production and treatment processes. For example, Japanese Patent No. 2917525 discloses the presence of nitro groups (—$NO_2$) derived from nitric acid used in surface treatment. Also, Japanese Patent No. 2865065 discloses the presence in titanium dioxide of nitrogen derived from nitric acid in a titanium oxide- sol-dispersed solution material, as observed by EPMA analysis.

However, the conventional recognition or wisdom is that this nitrogen is a contaminant and that compounds formed of the mixed nitrogen have a negative influence and have no observable good effect on photocatalyst performance, especially in the wavelength range of operating the light.

The reason why this mixed nitrogen causes no observable good effects on the wavelength range of operating light of photocatalytic substance is considered to be as follows.

Notably, this type of incorporated nitrogen atom forms only nitrogen oxides and organic substances inside the photocatalysts, and do not combine with titanium atoms. As a result, the mixed nitrogen atoms had no effects on optical properties as a semiconductor such as the band gap of titanium oxide.

In contrast, because the present invention is characterized by the fact that the nitrogen atoms are substituted for some of the oxygen sites of titanium oxide crystal, doped into interstitial sites of lattices of titanium oxide crystal, and/or doped to grain boundaries of titanium oxide, the XPS spectra thereof are different from those of nitrogen atoms conventionally incorporated in titanium oxide.

Among these, it is especially desirable that there be a chemical bond between titanium atoms and nitrogen atoms in the photocatalytic materials, and it is even more desirable that the constitution contains substituted nitrogen atoms for some of the oxygen sites of basic titanium oxide crystals.

The characteristic of the nitrogen doped photocatalytic articles of the present invention may be detected through analysis of the chemical bond state of nitrogen atoms with XPS (X-ray Photoemission Spectroscopy). The nitrogen doped photocatalytic materials of the present invention are characterized in that a binding energy spectrum of the 1s shell of a nitrogen atom as measured using XPS has a peak in the region at about 400 eV or less.

More preferably, a binding energy spectrum of the 1 s shell of a nitrogen atom in XPS is characterized by having a peak near 396 to 397 eV.

As a result, it is characterized by having an impurity level resulting from the substitution of nitrogen atoms for some of the oxygen sites of titanium oxide within the band gap between a valence band and a conduction band of titanium oxide.

Furthermore, it is desirable that the nitrogen concentration X expressed in atomic % is 0<X<13. Nitrogen content is not especially limited, but is preferably over 0 and below 13%. The photocatalytic activity described above is preferably obtained with a nitrogen content in such a range.

In addition, as long as nitrogen is in the above-described state, the number of oxygen atoms may be either excessive or deficient. In particular, if nitrogen is incorporated in a state where titanium oxide is reduced, photocatalytic activity is displayed even in the longer wavelength visible light region. Atomic ratio Y, Z, and X for titanium, oxygen, and nitrogen should be in the range of $0.4<Y/(X+Z)<0.6$.

These effects can be realized with Ti—O—N in any combination of single crystals, polycrystals, or amorphous Ti—O—N. However, single crystals and polycrystals tend to exhibit a greater photocatalytic activity than does amorphous Ti—O—N, and are, thus, preferred.

Moreover, titanium oxide crystals may be present on the external surface side of the above-described photocatalytic materials. With such a configuration, internal photocatalytic materials are able to absorb visible light to produce electrons and holes so that a photocatalytic action is exhibited by the titanium oxide crystals at the surface. As a result, visible light can be utilized as operating light with maintaining activities similar to conventional titanium oxide photocatalysts. For example, such a constitution is advantageous when it is desired to decrease the contact angle of water and to instill a hydrophilic property.

Moreover, it is preferable that the XPS spectrum of Ti—O—N has a spectrum derived from an ammonium salt.

Moreover, it is preferable that the surface of photocatalyst according to the present invention have mainly C axis crystal face orientation in practical use.

Photocatalysts may be employed such that they are formed on the whole or partial surface of a substrate. The substrate may be made of titanium oxide, silica, alumina, and inorganic oxides of their composites; titanium nitride, silicon nitride, aluminum nitride, and their composite nitrides; or organic substances such as composite oxynitride and fluororesin.

Furthermore, the photocatalysts of the present invention may have a form in which at least one of alumina, silica, zirconia, magnecia, calcia, calcium phosphate, amorphous titanium oxide, fluororesin, and the above materials further containing nitrogen is carried on the outmost surface of Ti—O—N.

The photocatalytic materials of the present invention may be preferably manufactured by at least one of the following manufacturing processes:

(1) formation as a thin film on a substrate by sputtering at least one of titanium oxynitride, titanium oxide, titanium nitride, and metallic titanium used as a target material in an atmosphere containing nitrogen gas;

(2) formation as a thin film on a substrate by vaporizing or ion plating at least one of titanium oxynitride, titanium oxide, titanium nitride, and metallic titanium used as a vaporizing material in an atmosphere containing nitrogen gas;

(3) formation by heat treating titanium oxide or hydrated titanium oxide in an atmosphere containing ammonia gas, nitrogen gas, or a mixture of nitrogen gas and hydrogen gas;

(4) heat treating a titanium alkoxide solution in an atmosphere containing ammonia gas, nitrogen gas, or a mixture of nitrogen gas and hydrogen gas;

(5) treating titanium oxide in a plasma containing nitrogen atom;

(6) implanting nitrogen atoms in titanium oxide by ion-implantation;

(7) formation as a thin film on a substrate by vacuum evaporating at least one of titanium oxynitride, titanium oxide, titanium nitride, and metallic titanium used as evaporating materials in an atmosphere containing nitrogen gas, followed by transfer to a different vacuum vessel by differential pressure;

(8) performing, in an emulsion combustion method, spray combustion of emulsion in an atmosphere in which ions or molecules (except nitrate ion) containing nitrogen elements such as ammonia and hydrazine are present in an aqueous solution or suspension of metallic salts which is the aqueous phase in emulsion and in which the amount of oxygen introduced into a reactor is less than that (hereinafter referred to as the required amount of oxygen) with which combustion components (oil and surface active agents) contained in the emulsion completely burn, and which metal ions (or metal compounds) contained in an aqueous solution require to form the most stable oxide in air;

(9) performing, in an emulsion combustion method, spray combustion of emulsion in an atmosphere in which nitrogen containing gas (except nitrogen gas) such as ammonia instead of ions or molecules (except nitrate ion) containing nitrogen atoms such as ammonia and hydrazine are contained in an aqueous solution or suspension of metallic salts which is the aqueous phase in emulsion and in which the amount of oxygen introduced into a reactor is less than the required amount of oxygen;

(10) mixing titanium oxide and titanium nitride and heat treating this mixture at temperatures from 400 to 700° C.; and

(11) heat treating or plasma treating titanium nitride or titanium oxynitride in an oxidation atmosphere containing oxygen, ozone, a water molecule, or a hydroxyl group.

Next, specific aspects of the structure of the photocatalytic materials of the present invention will be described.

Figure 6:
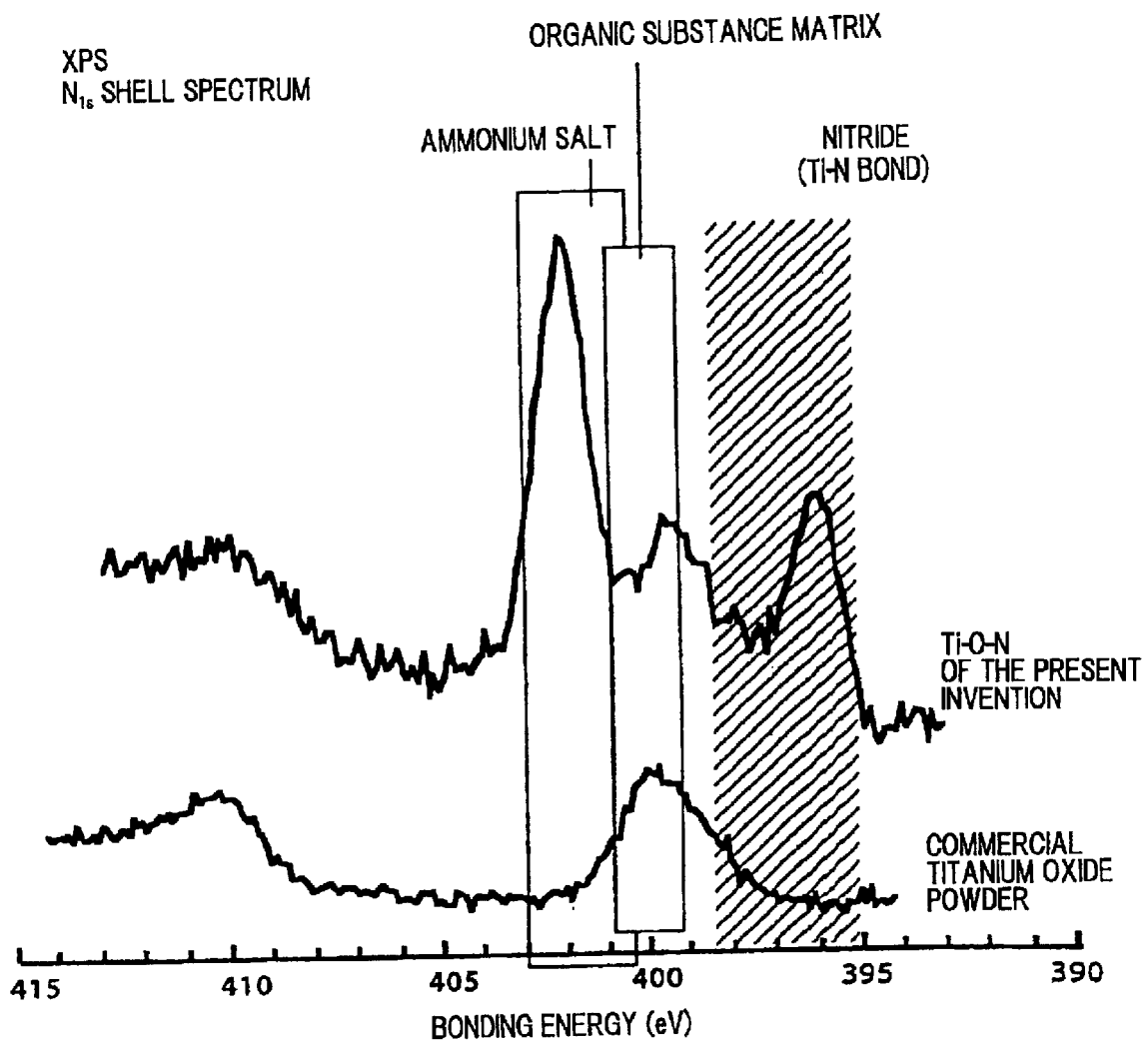
FIG. 6 shows a binding energy spectrum (XPS spectrum) of the 1s shell of a nitrogen atom in a photocatalytic material according to the present invention.

FIG. 6 shows a spectrum of the is shell of nitrogen atom by XPS analysis using a Mg-Kα X-ray. As shown in this figure, nitrogen atoms contained in conventional titanium oxide photocatalysts differ from those in the photocatalysts of the present invention in their chemical bond state. That is, as described above, nitrogen atoms contained in conventional titanium oxide form oxides and organic substances, whereas, in the photocatalysts of the present invention, nitrogen atoms show bonds to Ti atoms. This bonding of nitrogen in the present invention shows that the nitrogen is substituted for the oxygen sites in titanium oxide crystals, and not simply doped between lattices or interstitial sites of oxygen in crystals or between grains.

In addition to physical experiments, the present inventors have also studied the photocatalytic materials of the present invention using theoretical calculations. More specifically, electronic state and optical characteristics of semiconductor photocatalysts were evaluated by the FLAPW (full-potential linearized-augumented-plane-wave) process, which is one of the first principle calculation methods. As models, $TiO_{1.75}X_{0.25}$ (X=N, B, C, F, P, S) unit cells wherein anions were substituted for some of the oxygen sites of anatase titanium oxide were used.

Figure 7:
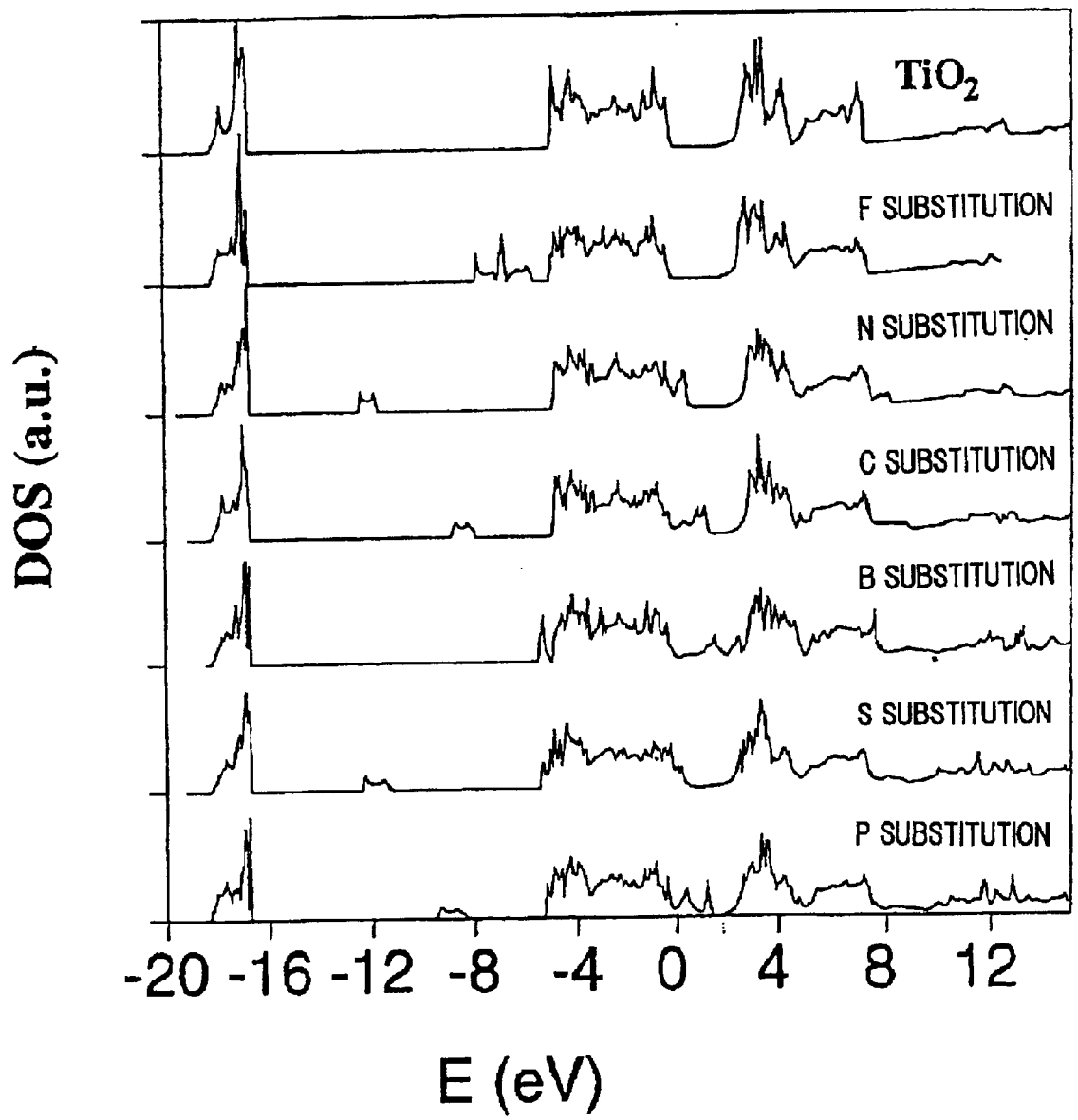
FIG. 7 shows the state density of Ti—O—X obtained by substituting X for certain oxygen sites.

FIG. 7 shows the calculated density of state (DOS) of Ti—O—X semiconductor. It was found that the position at which a new impurity level is formed varies with substitution species, and that the position also varies according to the ionicity of these substitution species. In this figure, a valence band rises on the minus side from energy 0 eV in each density of state, a conduction band of titanium oxide rises on the plus side from the vicinity of 2.5 eV, and the interval between them corresponds to a band gap. Because the reduction level of water is in the vicinity of the conduction band of titanium oxide, it is preferable to create a narrower band gap by moving the valence band closer to the conduction band of titanium oxide rather than the moving conduction band of titanium oxide.

It was found from the above that, from the viewpoints of both narrowing the band gap and of smooth mixing degree of impurity levels and the titanium oxide band, N (nitrogen) and S (sulfur) are especially preferable as substitution species X for operation under visible light.

Figure 8:
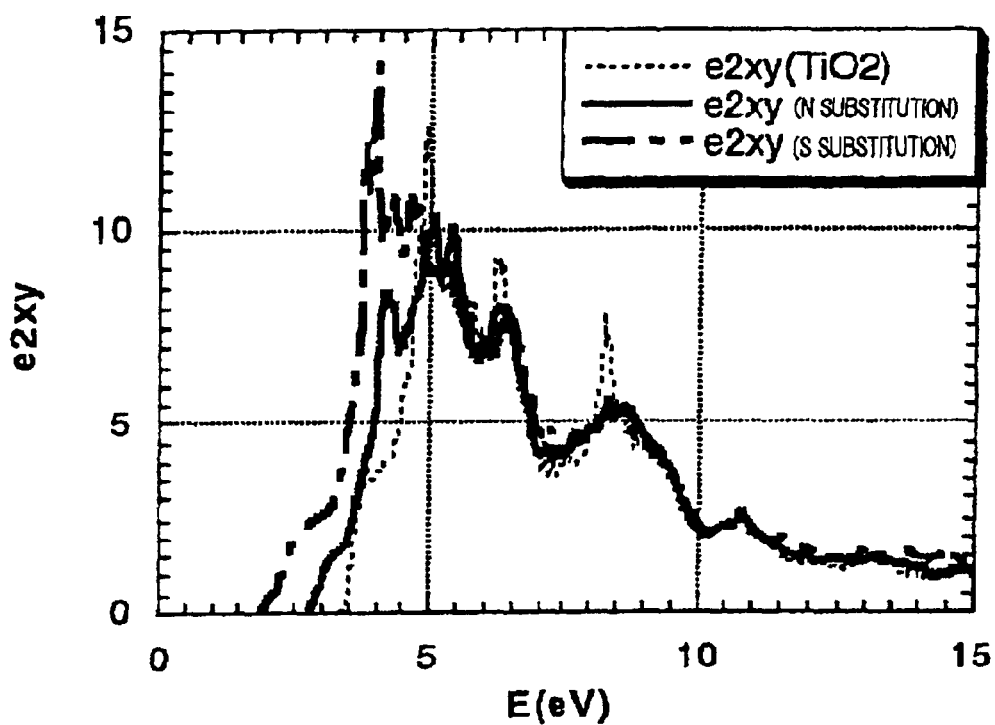
FIGS. 8(a) and 8(b) each show the energy dependency of the imaginary part of a dielectric function.
Figure 8:
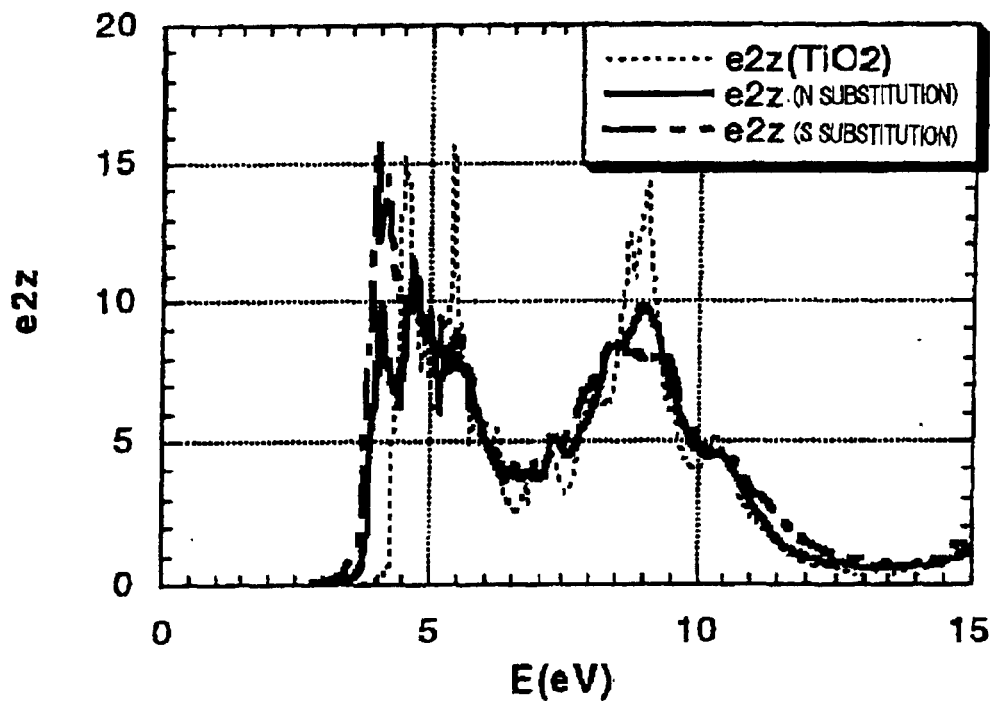

FIG. 8(a) and FIG. 8(b) show energy E (eV) dependency of the imaginary part of dielectric function (e2xy, e2z) obtained by calculation. FIG. 8(a) shows the energy dependency in the xy direction (vertical direction to C axis) for titanium oxide crystals, while FIG. 8(b) shows dependency in the z direction Ĉ axis direction).

This imaginary part of dielectric function corresponds to the wavelength dependency of optical absorption characteristics. In both Ti—O—N and Ti—O—S, absorption edges are shifted to the lower energy side, that is, the longer wavelength side than those of titanium oxide. This results suggest that visible light operation is possible by substitution of one of N and S or both in titanium oxide. Moreover, it can be seen from comparison of FIG. 8(a) with FIG. 8(b) that optical anisotropy is strong in both titanium oxide and Ti—O—X (X=N or S), and it can be understood from this result that dependency of a photocatalytic activity for a crystal face is strong.

Especially, it is also found that longer wavelength visible light is absorbed by Ti—O—N having a C axis orientation. Because the absorption edge in the xy direction is noticeably shifted to the visible light direction, it can be seen from this that the photocatalytic article of the present invention is suitable when the surface crystal face is mainly oriented in the direction of a C axis. Because light vertically incident to the surface has components of an electric field in propagation and vertical direction (the direction vertical to the surface), visible light can be efficiently absorbed when the surface is in the direction of the C axis crystal because of the light absorption characteristics in the xy direction in FIG. 8(a).

Changes in the electronic state of titanium oxide by substitution of these anions X are mainly due to the differences between the atomic levels between O, N, or S for titanium atom. Therefore, if the Ti—X bonding exists in photocatalytic articles in which titanium oxide is a substrate, the effects by substitution of the anions of the present invention are realized when other anions X are substituted for oxygen (O) as in the model used for the above calculation, when anions X intrude into lattices of a crystal by warping the lattice form, when anions X are present in grain boundaries, or when these latter situations are combined.

Now, as described above, there are some anions which may substitute for some of the oxygen sites of titanium oxide. When substituting nitrogen atoms for some of the oxygen sites, the electronic state of a semiconductor changes and new absorption bands are formed within band gaps. On the other hand, substituting, for example, cations such as Al, Cr for some of the oxygen sites is impractical, considering charge balance. Substituting nitrogen and fluorine for titanium sites is also impractical.

On the other hand, elements such as carbon and boron may substitute for not only the oxygen sites, but also for the titanium sites. When this occurs, the electronic states entirely differ according to the location of the substitution, even when the same atom is substituted.

Moreover, in contrast to semiconductors such as silicon, in oxide semiconductors like titanium oxide which are formed of more than two elements, adjacent atoms and the electronic states both differ according to the position of the doped impurities. Thus, description of impurities doped into a material without a description of the locations or sites, such as lattices or grain boundaries, where the impurities are located, is not sufficient to specify a material.

Furthermore, although in conventional examples, the tendency of doping effects was sometimes described by the valency of dopant, this is not significant because, as described above, the electronic states are completely dependent on the position into which dopant enters.

Therefore, when the state of nitrogen atoms of the present invention is discussed, it is not meaningful to classify the performance by means of the valence number such as pentavalence and trivalence. The present invention was completed by making absorption of visible light possible only when there is a chemical bond of Ti—N in Ti—O—N as a state of nitrogen atom and by finding exhibition of photocatalytic characteristics. Especially among these, the performance is highest when substituting nitrogen atoms for certain oxygen sites of titanium oxide.

The position of XPS peak of N1s shell when Ti—N bonding remains in titanium oxide may be estimated from data in scientific literature, such as National Institute of Standards and Technology (NIST). The peak of TiN is observed near 396–397 eV. In addition, N. C. Saha et al describe XPS data of Ti—O—N in *J. Appl. Phys.*, 72 (7), pp. 3072 (1992). Although nitrogen content in that example is considerably greater than that in the photocatalytic materials of the present invention, the N1s shell peak of Ti—O—N is observed near 396–397 eV similarly to TiN of NIST.

On the other hand, in the Ti—O—N of the present invention, the position of XPS peak when nitrogen atoms are doped in an interstitial site of lattices of titanium oxide is unknown as there are no published reports. The position of XPS peak may then be analyzed by FLAPW which is one of the most accurate first principle calculation methods. This gives quasi-quantitative calculation results. For calculation, N substitution type (a total of 24 atoms) and N interstitial type (a total of 25 atoms) models were used with 24 atom models of anatase titanium oxide as a basis. Table 1 shows results of these tests.

TABLE 1

| | Energy difference from Ti2p3/2 peak (eV) | | |
| --- | --- | --- | --- |
| | Ti—O—N (Substitution) | Ti—O—N (Intrusion) | Organic Compound Nitro Group |
| Calculation | −63.63 | −63.38 | — |
| Experiment | −62.8 | (Unclear) | −59.1 |

The XPS peak of the interstitial type N1s shell of intrusion Ti—O—N was obtained at a position 61.38 eV lower than the Ti2p3/2 peak. On the other hand, the XPS peak of the substitution type N1s shell was obtained at a position 63.63 eV lower than Ti2p3/2 peak. That is, the result was obtained that the peak of interstitial type N1s shell appears at a position 2.25 eV higher than that of substitution type N1s shell because the combination with an oxygen atom is more dominant in the interstitial type than in the substitution type.

On the other hand, in the XPS experiment of the Ti—O—N photocatalysts of the present invention, a Ti—N combination peak near 397 eV and a peak near 400 eV, which is higher by about 3 eV, were obtained. Therefore, it is considered from these results that a peak observed near 400 eV in the experiment indicates N atoms in the interstitial site of titanium oxide lattices or impurity nitrogen (according to NIST data) forming a carbon compound and a nitro group or the like.

From the above experimental results and from theoretical calculation, it can be understood that the following points are important for the Ti—O—N visible light operation photocatalysts of the present invention.

The Ti—O—N visible light operation photocatalysts of the present invention include photocatalytic materials in which nitrogen atoms are contained in titanium oxide crystals by either one or a combination of substituting nitrogen atoms for some of the oxygen sites of titanium oxide crystals, doping nitrogen atoms at interstitial sites of lattices of a titanium oxide crystal, or doping nitrogen atoms to grain boundaries of titanium oxide. Then, the XPS peak of N1s shell is observed at 400 eV or less. It is especially desirable that nitrogen atoms have a chemical bond between titanium atoms of titanium oxide and Ti—N. Furthermore, it is desirable that nitrogen atoms are present as substitutions for some of the oxygen sites of titanium oxide crystals. Then, the XPS peak of N1s shell is observed near 396 to 397 eV.

Moreover, although for the above calculation, the effects of anion doping were studied using lattices of an anatase type titanium oxide crystal, similar effects are obtained also in the anion doping to rutile type, brookite type, and amorphous type titanium oxides.

The composition ratio of these powders and films exhibiting visible light operation photocatalytic performance will be described in the examples below in which compounds having the empirical formulae $Ti_{33.9}O_{64.7}N_{1.4}$, $Ti_{34}O_{65}N_1$, and $Ti_{31}O_{67}N_2$ were produced when N in a state of Ti—N bond is realized, visible light operation photocatalysts are obtained in either oxygen excess or reduced titanium oxides. The atomic number ratio Y, Z, and X for titanium, oxygen, and nitrogen may be in the range of $0.4<Y/(X+Z)<0.6$.

Reference will now be made to certain particular embodiments of the present invention which are provided solely for purposes of illustration and are not intended to be limitative. Constitution of the Photocatalytic Material Embodiment 1

FIG. 1 shows the constitution of Embodiment 1 of the present invention. In this Embodiment 1, a Ti—O—N film 12 of the photocatalytic material is formed on a $SiO_2$ substrate 10. The structure of this Ti—O—N film 12 is such that nitrogen atoms substitute some of the oxygen sites in the titanium oxide crystals. A structure obtained by doping nitrogen atoms at the interstitial sites of lattices of a titanium oxide crystal or a combination of both may also be employed. The composition ratio of each element in Ti—O—N film 12 is, for example, $Ti_{31}O_{67}N_2$. Thus, Ti—O—N film is basically a titanium oxide crystal and has the constitution of containing N in a titanium oxide film. In addition, rutile and anatase, for example anatase+rutile, may be employed as the crystalline phase of a titanium oxide crystal.

Figure 2:
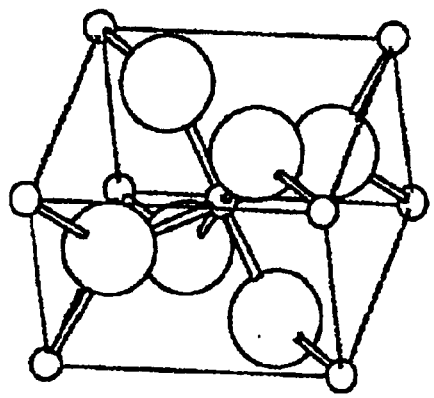
FIGS. 2(a) and 2(b) each illustrate a crystalline phase of titanium oxide.
Figure 2:
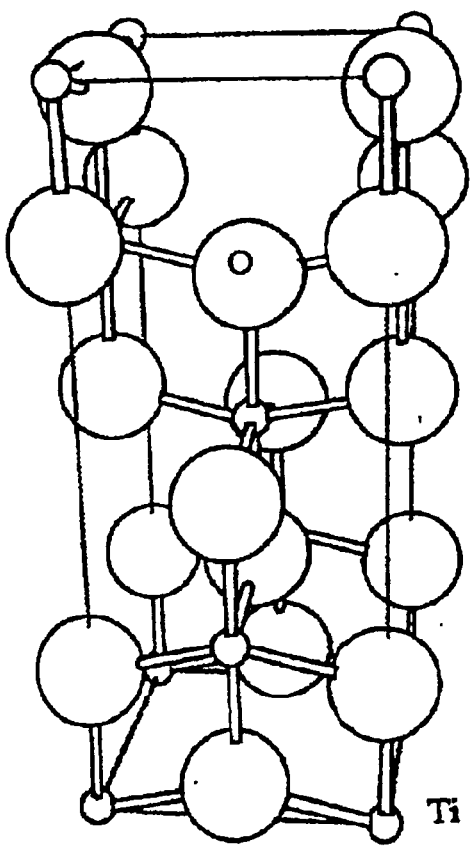

FIG. 2(a) shows rutile type titanium oxide crystals and FIG. 2(b) shows the crystalline unit lattices of anatase type titanium oxide. In these figures, small and large ○ symbols are used to show Ti and O, respectively. Ti—O—N is formed by substitution of N for a part of this O or by entrance of N into a space within crystal lattices or grain boundaries of titanium oxide crystals.

An exemplary manufacturing process for producing such photocatalytic materials will be described. In this example, Ti—O—N film 12 is formed by RF magnetron sputtering.

$SiO_2$ substrate 10 and a titanium oxide target are set in a vacuum chamber of a RF magnetron sputtering device. Then, appropriate amounts of $N_2$ gas and inert gas (for example, Ar gas) are introduced into the vacuum chamber to conduct sputtering in ($N_2$+Ar) plasma. Ti—O—N film 12 is accumulated on a $SiO_2$ substrate 10. As the substrate 10, various materials, such as ceramic, can be utilized.

During sputtering, the whole gas pressure may be set at, for example, 0.52 Pa and $N_2$ partial pressure in the range of 0%<$N_2$ partial pressure≦100%, but the suitable ratios range from about 20 to 60%.

After the depositing of the Ti—O—N film 12 by sputtering, heat treatment (annealing) is performed for crystallization. For example, crystallization may be conducted by heat treating in a nitrogen atmosphere at 550° C. for about two hours. That is, although simple film deposition yields an amorphous structure containing polycrystals, through heat treatment it is possible to obtain poly- and single-crystallization and further to give titanium and nitrogen having chemical bonds. Moreover, although the post-heat-treating may be eliminated by forming Ti—O—N film 12 while heating the $SiO_2$ substrate 10, the resulting photocatalytic performance is inferior to that which results when annealing is performed after deposition of the film.

Moreover, nitrogen content of the Ti—O—N film was 6.6 at % before heat treatment and 1.4 at % after heat treatment for film deposition by $N_2$ partial pressure 20%, and 12.7 at % before heat treatment and 0.5 at % after heat treatment for film deposition in $N_2$ partial pressure 100%. In addition, in case of film deposition in $N_2$ partial pressures of 40% and 60%, nitrogen content in Ti—O—N film after heat treatment was 1.4 at % and 1.5 at %, respectively.

All these Ti—O—N films exhibited photocatalytic activity. It was found that nitrogen suitable content of Ti—O—X film was 0<X<13 when the ratio in atomic percent was taken as X%. Moreover, as a photocatalytic activity of Ti—O—N film, that after heat treatment is superior and as the nitrogen concentration after heat treatment, several percent or less, and more preferably 2% or less, is desirable.

Furthermore, although in the above example, Ti—O—N film 12 was deposited using the titanium oxide target in plasma of Ar gas containing $N_2$, the film may be deposited in plasma containing $O_2$ gas with TiN (titanium nitride) target. Further, as a target, titanium oxide+TiN may also be used.

Further, Ti—O—N film 12 may also be deposited by vacuum evaporation in ($N_2$+$O_2$) gas with Ti ingot.

Moreover, although in the above example, Ti—O—N as a photocatalytic material in the form of a thin film was described, Ti—O—N can not only be applied in a thin film, but can also be included in binder materials for painting such as silica, alumina, fluororesin, those containing nitrogen, and compound complexes thereof in which fine grain Ti—O—N based Ti—O—N is mixed and in silica, alumina, fluororesin or those containing nitrogen, or compound complexes of them used as internal base materials, on the whole surface or a part of the external surface side of which Ti—O—N is formed.

Furthermore, it is possible for Ti—O—N to be prepared by various methods of preparing fine grain, a sol gel method, and a chemical reaction method with the above manufacturing process as a base. Specific examples will be described later.

The Ti—O—N photocatalytic material obtained in this way exhibits a photocatalytic activity by incidence of visible light. That is, the Ti—O—N photocatalytic material exhibits a photocatalytic activity when irradiated with visible light as well as ultraviolet light, resulting in improvement in a hydrophilic property (decrease in the contact angle of water)

and the ability to decompose organic substances. Hence, not only can Ti—O—N be used with visible light as the operating light, but also, as a result, there is notable improvement in the photocatalytic activity when the material is irradiated with light in the ultraviolet to visible region. In particular, it is markedly superior to a titanium oxide photocatalyst in the ability to decompose organic substances.

Embodiment 2

Figure 3:
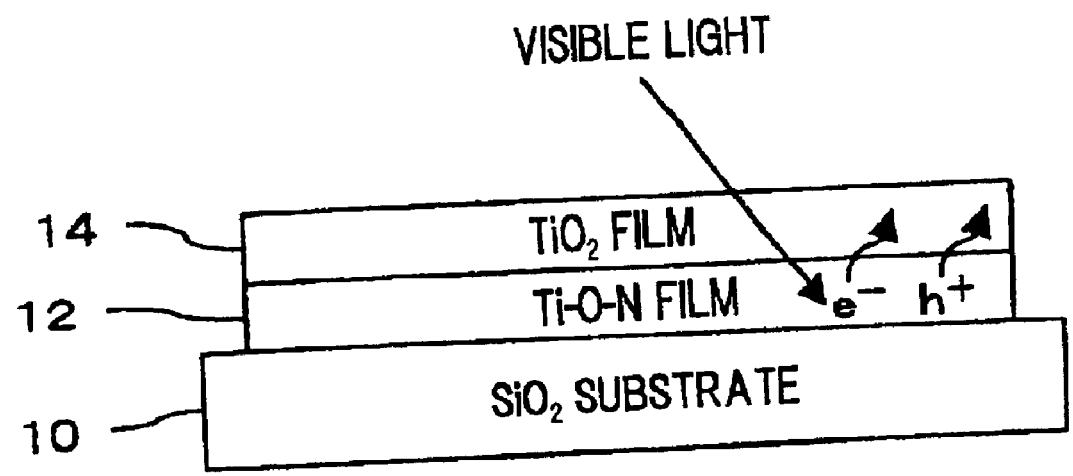
FIGS. 3(a) and 3(b) each illustrate the constitution of Embodiment 2 of the present invention.
Figure 3:
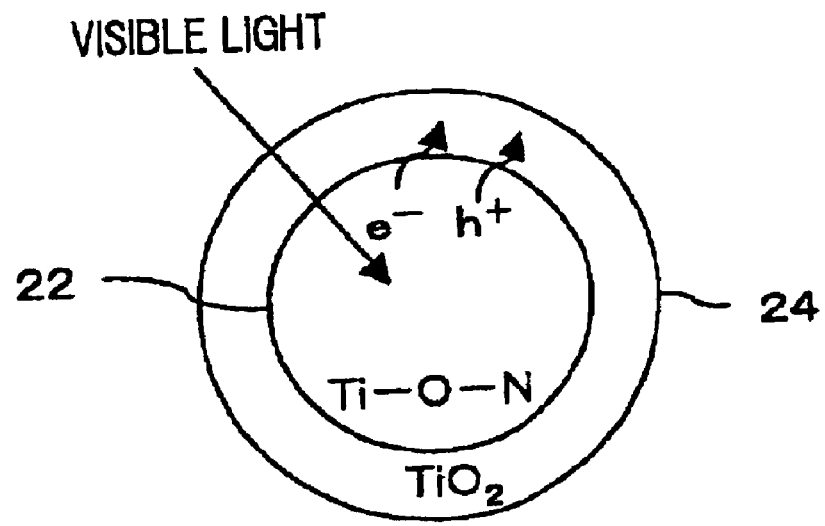

FIG. 3 shows the constitution of Embodiment 2 of the present invention. In FIG. 3(a), Ti—O—N film 12 is formed on the SiO$_2$ substrate 10, and titanium oxide film 14 is formed thereon. Moreover, although in FIG. 1, a two layer laminated structure is shown, the boundaries of both may become indistinct in the course of heat treatment or the like, resulting in the constitution that N gradually decreases toward the surface. That is, Ti—O/Ti—O—N film of gradient composition is formed in which the amount of N atom is less at positions nearer to the surface, and in which titanium oxide is exposed at the outmost surface, though it is also possible to maintain a distinct boundary between the Ti—O—N and titanium oxide films.

Moreover, gradient composition can be produced not only by heat treatment after lamination layer formation of Ti—O—N and titanium oxide films, but also by changing the gas composition in an atmosphere according to the deposition state of the film. That is, it is possible to form titanium oxide on the surface side by gradually decreasing the N$_2$ partial pressure of the atmosphere.

With such a constitution, visible light is absorbed in the Ti—O—N region (Ti—O—N film 12) near the substrate 10 to produce electrons and holes, which are supplied to titanium oxide (titanium oxide film 14). In this manner, a photocatalytic activity is exhibited at the surface of the titanium oxide film 14.

Hence, in the titanium oxide film, similar to the conventional example, a photocatalytic activity is produced using visible light as operating light. Because the hydrophilic property (contact angle θ) of TiO$_2$ films is superior to that of Ti—O—N, improvement in hydrophilic property by the TiO$_2$ film deposited onto the surface can be achieved using visible light as the operating light. That is, with the configuration of this embodiment, it is possible for hydrophilic property to be exhibited by irradiation of only visible light and to improve the long-term hydrophilicity of the TiO$_2$ film.

Furthermore, it is suitable that the Ti—O/Ti—O—N photocatalyst of gradient composition, as shown in FIG. 3(b), be in the form of a grain having Ti—O—N part 22 on the inside and TiO$_2$ part 24 on the outside. It is suitable that such a photocatalyst in the form of a grain is mixed in a binder for paints such as silica, alumina, fluororesin, those containing nitrogen, or complex oxides of them and is utilized like paint.

Embodiment 3

FIGS. 4(a) and 4(b) show the constitution of Embodiment 3 of the present invention. The inside of the photocatalytic substance of this Embodiment is titanium oxide TiO$_2$ and the outmost surface side of the outside is Ti—O—N. In addition, Ti—O—N layer at this time may cover the entire outmost surface or form only a part of the surface. Such constitution is mainly realized when nitride treatment is performed from the surface side by after treatment such as heat treatment and plasma treatment using titanium oxide powder and film as a starting material.

Embodiment 4

Figure 5:
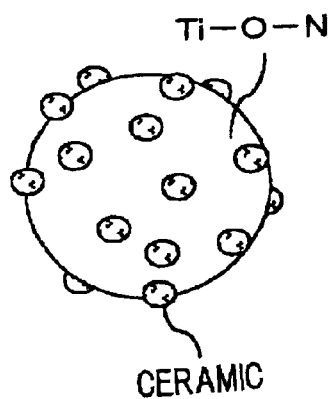
FIGS. 5(a), 5(b), and 5(c) each illustrate Embodiment 4 of the present invention.
Figure 5:
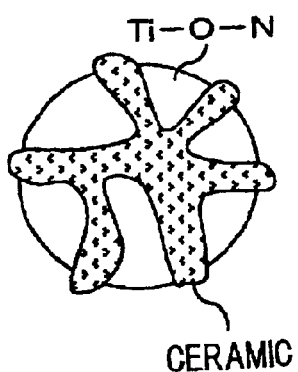
Figure 5:
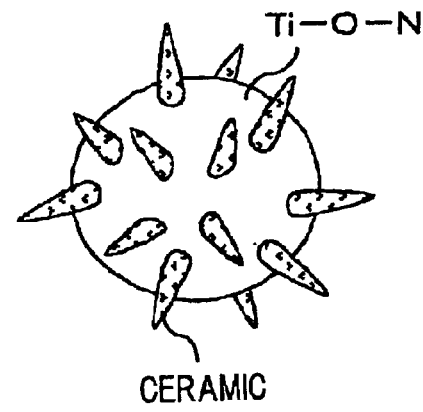

FIGS. 5(a), 5(b), and 5(c) show the constitution of Embodiment 4 of the present invention. When the Ti—O—N photocatalyst of the present invention is employed by mixing into an organic fiber and plastic, a problem occurs that the above-described organic fiber and plastic is decomposed by its direct contact with the Ti—O—N photocatalyst. In Embodiment 4, to solve this problem, ceramic with a lower catalytic activity is carried on the surface of the Ti—O—N photocatalyst in an island, needle, or mesh form. FIGS. 5(a), 5(b), and 5(c) respectively illustrate island, mesh, and needle configurations. By arranging ceramic with a low activity on the surface in this manner, it is possible to control the decomposition of an organic fiber and plastic through the ceramic material with which it is in contact. Ceramics include alumina, silica, zirconia, magnesia, calcia, calcium phosphate, amorphous titanium oxide, fluororesin, and their nitrogen or compound complexes.

Photocatalyst Preparation

In addition to the results showing the features of the structure described in the above Embodiments 1 to 4, the present invention also provides manufacturing processes for the photocatalysts of the present invention. Notably, it is necessary to select a condition such that nitrogen atoms tend to have a negative valency. This can be accomplished, for example, through use of:

1. a reducing atmosphere, and
2. a vacuum vessel to recombine and reconstitute nitrogen containing titanium oxide after separating Ti, O, and N atoms, from which a materials is formed, by ion beam and plasma irradiation.

In the manufacturing processes of the present invention, from these standpoints, manufacturing processes of nitrogen doped titanium oxide presenting a high photocatalytic activity also in the visible light region are also be described.

Moreover, the crystalline structure prepared in the present invention which is a basis of nitrogen doped titanium oxide may be any of anatase, rutile, and brookite.

Specific example manufacturing processes will be described in the following Embodiments 7 to 14 described in Examples 7 to 14.

Exemplary Photocatalysts

In the following, real characteristics of exemplary visible light operation type photocatalysts of the present invention are described. However, these examples are provided solely for purposes of illustration and are not intended to be limitative.

EXAMPLE 1

In this example, a Ti—O—N film corresponding to the above Embodiment 1 was employed. Using an RF magnetron sputtering device, Ti—O—N film was formed on a substrate by sputtering a titanium oxide target in (N$_2$+Ar) plasma. The substrate was SiO$_2$. The whole gas pressure during sputtering was 0.52 Pa and N2 partial pressure varied between 0 and 100%. The deposition rate was 3 to 8 nm/min. After depositing, the Ti—O—N film was crystallized by heat treating in a nitrogen atmosphere at 550° C. for two hours. The crystalline phase in the Ti—O—N film was anatase+rutile, and TiN was not observed. In addition, the composition ratio after heat treating of a film sputtered in 40% N2+Ar was found to be Ti$_{31}$ $_{O67}$N$_2$ by XPS (X-ray electron spectroscopy) analysis. The peak of the N1s shell spectrum of nitrogen was observed near 397 eV and near 400 eV and it was also confirmed that there is a Ti—N bond in the Ti—O—N phase.

Figure 9:
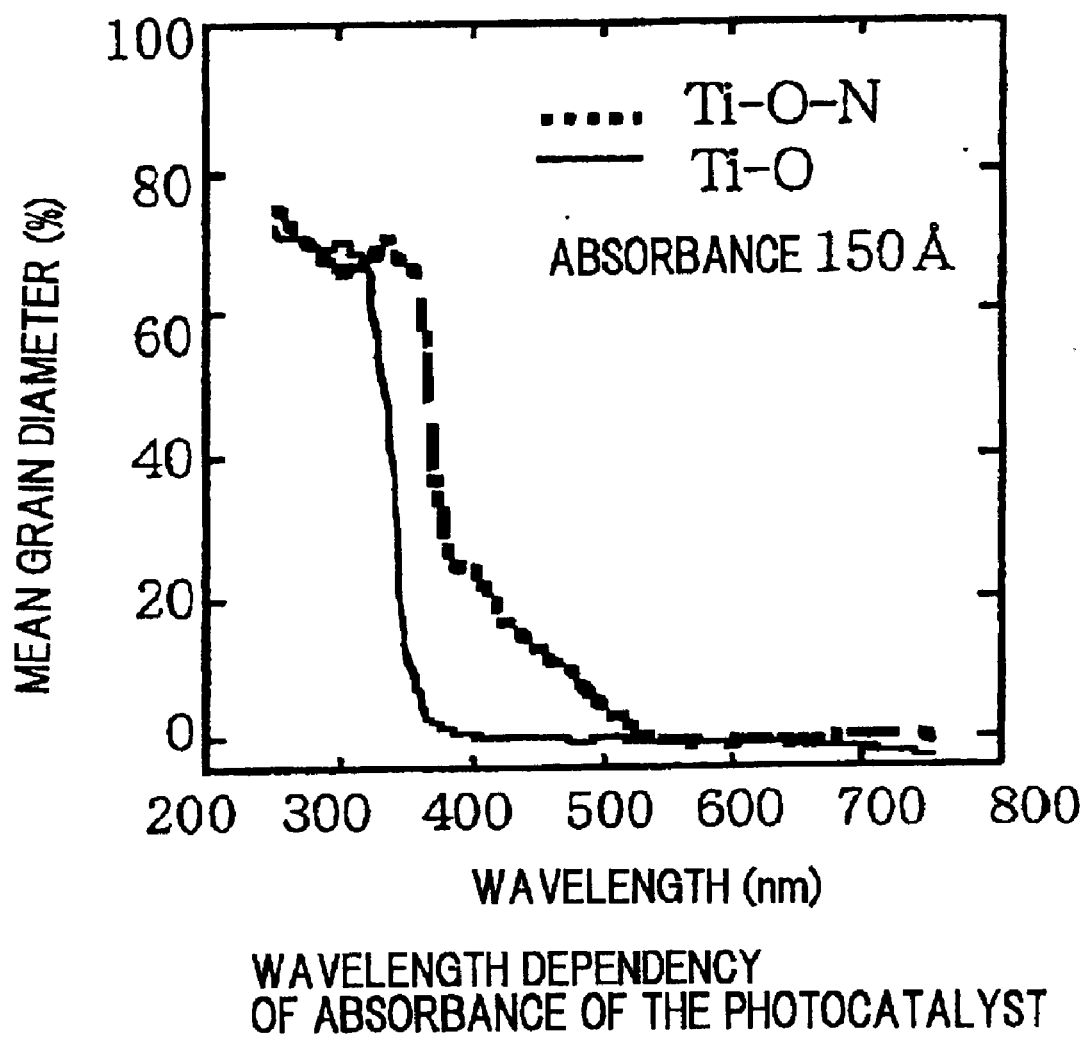
FIG. 9 shows the wavelength dependency of the light absorbance of the present photocatalysts.

In order to examine optical characteristics of this Ti—O—N film, the wavelength dependency of absorbance was measured. The results are shown in FIG. 9. A comparison between anatase+rutile $TiO_2$ (Ti—O) film and Ti—O—N film with the same grain diameter D to 15 nm reveals that the Ti—O—N film can absorb light with a longer wavelength than the Ti—O. Ti—O—N film also considerably absorbs light with a wavelength of about 400 nm. It was found from this that the Ti—O—N film is a semiconductor which absorbs visible light to produce electrons and holes.

To examine the photocatalytic activity of this Ti—O—N film when irradiated with only visible light, the light irradiation dependency of the contact angle $\theta$ of water at the surface was determined.

Figure 10:
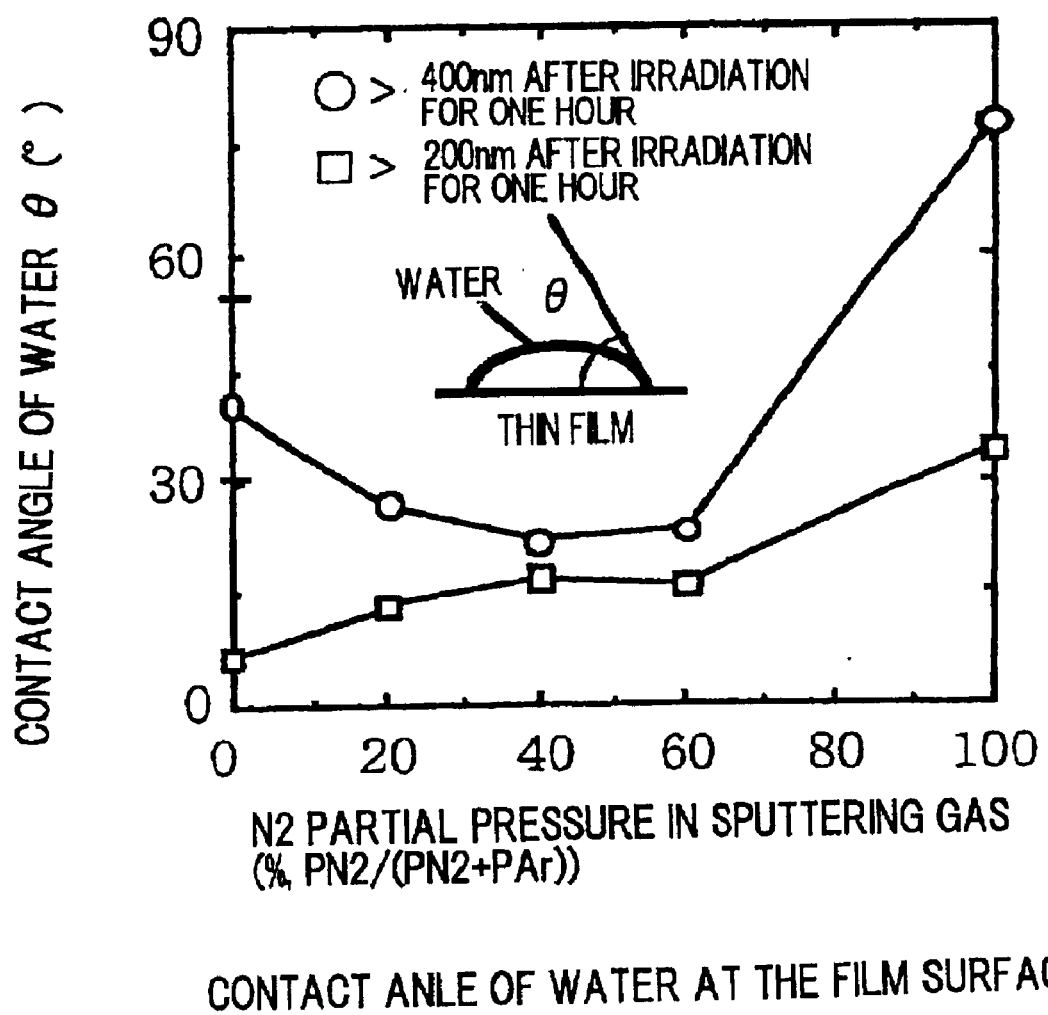
FIG. 10 illustrates the contact angle of water on a film surface.

FIG. 10 shows the contact angle $\theta$ of water at the film surface when the Ti—O—N film, which was prepared by varying $N_2$ partial pressure between 0 and 100% and was heat treated at 550° C., is irradiated by a Xe lamp for one hour (the symbol in the figure is □). For pure titanium oxide ($N_2$ partial pressure is 0%), the hydrophilic property of the contact angle $\theta<10°$ develops by a photocatalytic action with ultraviolet light with a wavelength of 200 nm or longer. On the other hand, the $\theta$ of Ti—O—N film prepared in the presence of $N_2$ increases with increasing $N_2$ partial pressure on sputtering due to the effect of N. These optimum $\theta$ values are the essential values for each Ti—O—N film composition.

In FIG. 10, the characteristics when these Ti—O—N films were irradiated for one hour with only visible light (wavelength $\lambda>400$ nm) is indicated with the symbol ○. Here, the ultraviolet light region consisting of light with wavelengths less than 400 nm was optically filtered. As a result, the $\theta$ values of a film prepared in N2 partial pressure 20 to 60% were also reduced to approximately optimum values when irradiated with only visible light. On the other hand, in a pure titanium oxide film, the value for $\theta$ is considerably large when the film is irradiated with only visible light. In can be seen that Ti—O—N film exhibits a photocatalytic action when irradiated with visible light.

EXAMPLE 2

In Embodiment 1, because the contact angle at the surface of Ti—O—N film becomes small when irradiated with only visible light, it was clarified that Ti—O—N is a photocatalyst which is operated even when irradiated with only visible light. However, when, for the contact angle of this film, only the absolute value of the contact angle is compared from the standpoint of application utilizing a hydrophilic property such as a mirror and a window, the Ti—O—N film of the present invention is inferior to a titanium oxide film. In this Example 2, a photocatalyst having a laminate type film constitution of Ti—O—N film corresponding to the above Embodiment 2 was compared with a titanium oxide film.

The constitution of Embodiment 2 is as shown in FIG. 3(a). The photocatalyst of the present example was formed in such a way that first a Ti—O—N film 12 of 2200 Å and then a titanium oxide film of 1000 Å were deposited on a $SiO_2$ substrate and then heat treatment was performed in an oxygen atmosphere at 550° C. for 90 minutes. Through this process was formed a Ti—O/Ti—O—N film of gradient composition in which the concentration of N atom is less nearer to the film surface and in which titanium oxide is exposed at the outmost surface. XPS examination of the distribution of nitrogen atoms for every 50 Å in the depth direction of the film revealed no nitrogen atoms present up to a depth of 50 Å from the outmost surface and that the atomic % ratio of nitrogen progressively rose at deeper levels. The ratio of nitrogen in atomic % immediately before Si of the substrate begins to be observed is 2.9%. In addition, the peaks of the N1s shell spectrum of nitrogen at a deeper place than 100 Å were observed both at 397 eV and at 400 eV and it was also confirmed that a Ti—N bond is present in a Ti—O—N phase.

Figure 11:
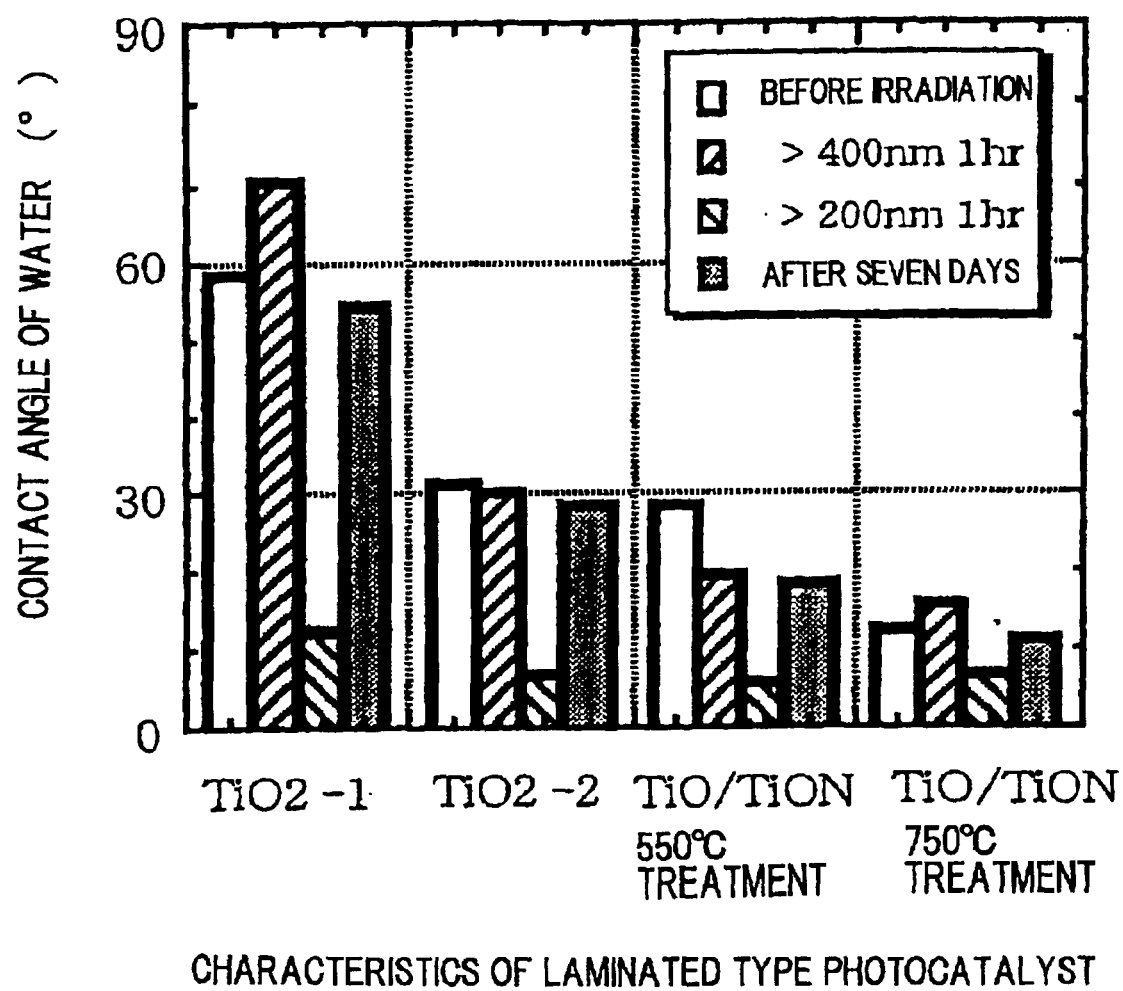
FIG. 11 shows the characteristics of a lamination type photocatalyst of the present invention.

FIG. 11 shows a measurement example of the contact angle $\theta$ of water. Under irradiation of visible light with a wavelength of 400 nm or longer, no reduction in the contact angle in the titanium oxide film was observed. On the other hand, for Ti—O/Ti—O—N film of gradient composition, the contact angle was reduced even when irradiated with visible light with a 400 nm or longer wavelength, and shows a smaller value than that of a titanium oxide film. In addition, this effect was maintained for a relatively long time. That is, after a contact angle $\theta$ as small as that of a titanium oxide film was obtained under irradiation with a Xe lamp, photocatalytic reaction to the visible light component of a fluorescent light was maintained even when the catalyst was allowed to stand on a table under fluorescent light for seven days. No great deterioration of the contact angle of water, like a titanium oxide film, was observed.

Moreover, from the results of Example 2, it was confirmed that there are also equal characteristics when the total film thickness is 1600 and 2500 Å and in addition, the similar effects are also shown when a sharp interface instead of gradient composition is formed with the composition varying in successive steps.

Furthermore, with a photocatalyst according to Embodiment 2, because ultraviolet and visible light are absorbed, in addition exhibiting a hydrophilic property, additional functions such as sterilizing and decomposing toxic substances such as dioxin and nitrogen oxides are obtained. While these functions can also be obtained using a titanium oxide, with the present invention additional functions are realized with a higher efficiency than obtained through use of a titanium oxide film.

EXAMPLE 3

Figure 12:
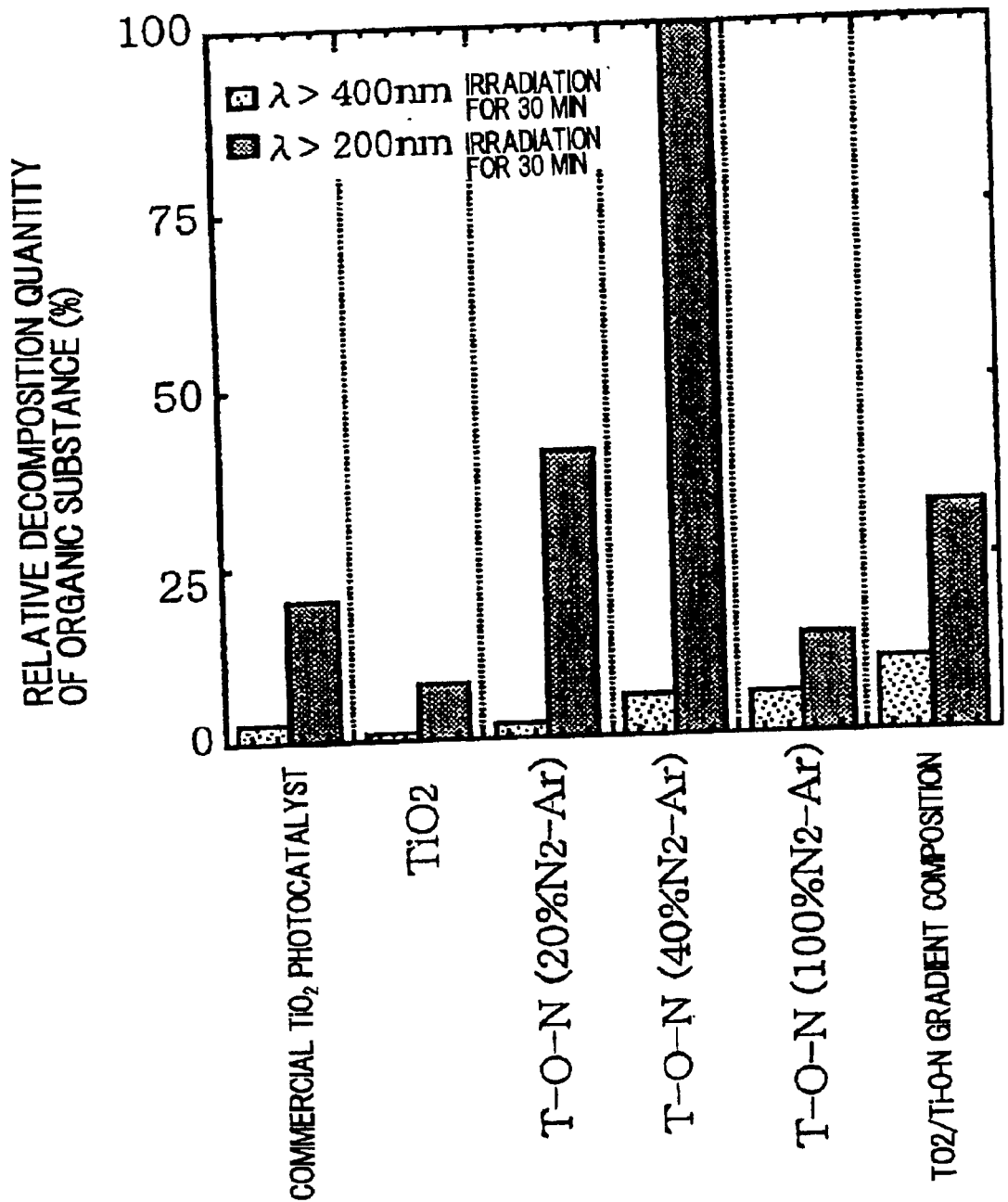
FIG. 12 shows a comparison of the decomposition performance of organic substances on photocatalysts.

Example 3 compares the performance of decomposing organic substances at the film surface of Embodiments 1 and 2. FIG. 12 shows the amount of decomposition of organic substances applied to the surface of each catalytic film when irradiated with light. For comparison, the results of a commercial titanium oxide photocatalytic film with equal film thickness prepared by a sol gel method are collectively shown. The light source was a Xe lamp, the irradiation wavelength region was adjusted with a sharp cut filter, and further a heat absorbing filter was used to prevent a rise in the temperature of a sample. The power of irradiated light was about 13 $mW/cm^2$ in the ultraviolet light region.

When irradiated with only visible light with a wavelength $\lambda>400$ nm, the performance for decomposing organic substances for the Ti—O—N films prepared according to Embodiments 1 and 2 are both superior to that observed for the titanium oxide film, the decomposition rate for the gradient composition film was especially markedly superior, about four times that for the titanium oxide film. In addition, when irradiated with ultraviolet-visible light with $\lambda>200$ nm, the performance of decomposing organic substances for the Ti—O—N film in Embodiment 1 is very great compared with the titanium oxide film. The decomposition rate of organic substances for the Ti—O—N film prepared at $N_2$ partial pressure 40% is at least over four times that of the titanium oxide film ($N_2$ partial pressure 0%). It can be understood from these results that the Ti—O—N film of the present invention exhibits the most superior performance for decomposing organic substances among photocatalytic actions.

Moreover, the results showed that a sputtering film prepared in 40% $N_2$—Ar has a decomposing rate four times that of a commercial oxide film when irradiated with visible light with λ>400 nm, and eight times under light with λ>200nm higher than a commercial titanium oxide film, even under an intensity of about 5 mW/cm$^2$, which is approximate to that at the time of a clear summer day in a temperate climate. This demonstrates the facile effectiveness of the present invention under light intensities of as low as about 5 mW/cm$^2$.

EXAMPLE 4

Example 4 was prepared by nitriding a titanium oxide powder as an initial material. A commercial rutile type titanium oxide powder (Ishihara Sangyo Kaisha, Ltd., TTO-55 (N)) treated in a mixed gas of ammonia and argon at 600° C. for three hours was used. The photocatalytic performance was evaluated by the change of absorbance of an aqueous methylene blue solution at λ=670 nm after irradiation with visible light for 10 hours. The light source used was a 10 W fluorescent tube (Matsushita Electric Works, Ltd., FL10N) to which was attached an ultraviolet cut filter (Fujifilm, SC42) such that visible light with λ approximately ≧400 nm was irradiated. Ultraviolet intensity was 0.0 μW/cm$^2$ as measured using Topcon light-intensity meters UVR-2 and UD-36). In addition, when measuring photocatalysts, the photodecomposition of methylene blue in the absence of the photocatalysts and the adsorption in the dark or the effects of absorbance changes due to photoadsorption were removed.

Figure 13:
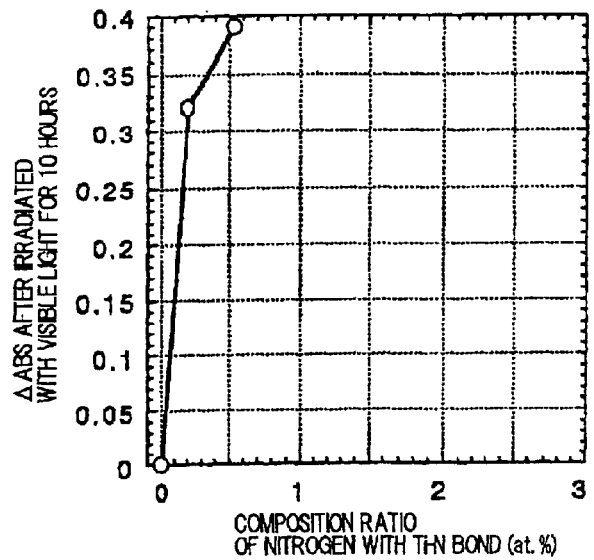
FIGS. 13(a), 13(b), and 13(c) each show the relationship between photocatalyst performance under visible light and the bonding state of nitrogen atoms in an Embodiment 4.
Figure 13:
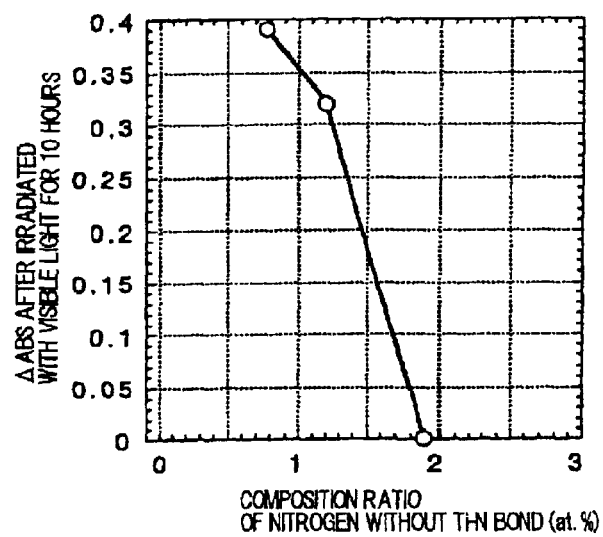
Figure 13:
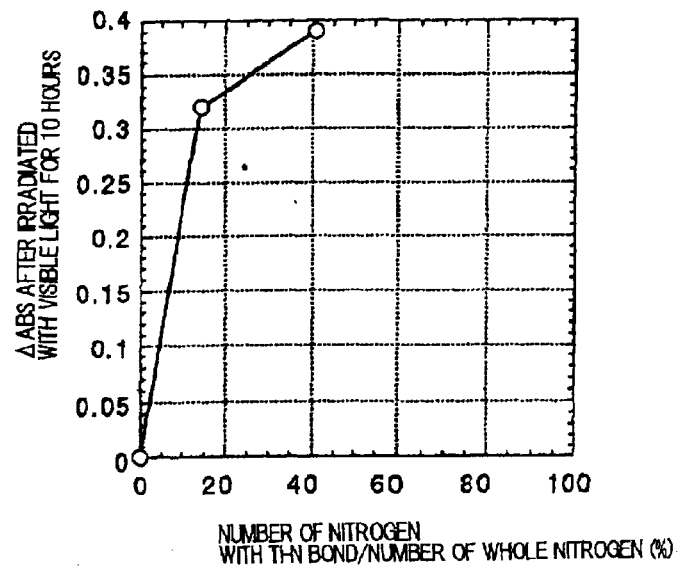

The spectrum of N1s shell due to XPS was analyzed using Mg-Kα and X-ray. The horizontal axes of FIG. 13($a$), FIG. 13($b$), and FIG. 13($c$) show the composition ratio of N in which a peak is seen near 397 eV and which has a Ti—N bond, that of N which has a peak near 400 eV, and the proportion of N having a Ti—N bond among the whole composition ratio of N in photocatalyst powders, respectively. From FIG. 13($a$) and FIG. 13($c$) it can be seen that photocatalytic performance under visible light irradiation improved with increasing N having a Ti—N bond. On the other hand, N having no Ti—N bond in FIG. 13($b$) had no effects on photocatalytic performance under visible light irradiation. N in this FIG. 13($b$), as described above, is considered to be nitrogen atoms mainly forming an organic compound and a nitro group. It is found from these results that forming N having a Ti—N bond in Ti—O—N in which a peak is observed near 397 eV is necessary for visible light operation of a photocatalyst.

Similar effects were also obtained when anatase type titanium oxide (Ishihara Sangyo Kaisha, Ltd., ST-01) was used as an initial material. Similar effects were again obtained when performing similar treatment using an amorphous titanium oxide powder. In such a configuration, there is also an effect that the state of N atoms is easier to control than when anatase and rutile crystalline powders are used as an initial material.

Furthermore, similar effects were also obtained when a titanium oxide powder was treated in plasma containing nitrogen atoms at a higher temperature than room temperature. Photocatalytic performance was found to be inferior in substances plasma treated at room temperature.

EXAMPLE 5

From Example 4 it could be seen that the photocatalytic substance of the present invention can be realized by post-treating a titanium oxide powder. However, when a titanium oxide powder with large grain diameter or a thick film of titanium oxide is nitrided after production, the inside of the photocatalytic substance may be a titanium oxide and the outermost surface side of the outside may be Ti—O—N, depending on treatment conditions.

By mixing colloidal silica and additives in a commercial titanium oxide powder (Ishihara Sangyo Kaisha, Ltd., ST-01), a simple coating solution was prepared. The solution was applied to a glass substrate form and dried, and then the substrate was subjected to heat treatment in air at 150° C. for 30 minutes. Cross section observation by SEM (scanning electron microscope) showed that the film thickness was 500 nm. Subsequently, this film was heat treated in a flow of ammonia gas 75 sccm and argon gas 100 sccm at 550° C. for 30 minutes. As a result of this treatment, the whitish transparent film was changed into a yellowish transparent film. Structural analysis by X-ray diffraction and depth direction analysis by XPS of this revealed that it has Ti—O—N and Si—O—N at the film surface, titanium oxide and silicon oxide near the glass substrate, and gradient composition, with the nitrogen composition ratio decreasing from the outermost surface through the inside of the film. The photocatalytic characteristics of this film was evaluated. After the light transmission characteristics of the film were determined in the wavelength range of 400 to 750 nm, the film was immersed in an aqueous 500 μM methylene blue solution for 15 minutes and then dried in a dark location. After the light transmission characteristics were again determined, visible light from a 10 W fluorescent tube (Matsushita Electric Works, Ltd., FL10N) to which an ultraviolet cut filter (Fujifilm, SC42) was attached was irradiated for 18 hours. The methylene blue (MB) decomposition rates after irradiation for 18 hours obtained by determining the light transmission characteristics were 8% for a titanium oxide coating film and 46% for Ti—O—N film of gradient composition.

Figure 4:
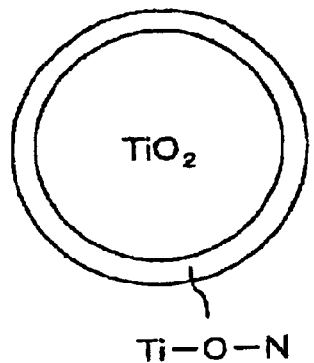
FIGS. 4(a) and 4(b) each illustrate Embodiment 3 of the present invention.
Figure 4:
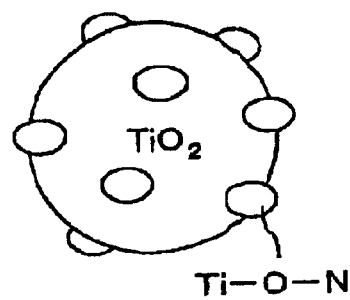

Similar experiments were performed using a powder. An anatase titanium oxide powder (Furukawa Co., Ltd., FA-55W) with an average primary grain diameter of 0.118 μm was heat treated in a gas flow of ammonia gas 400 sccm and argon gas 200 sccm at 550° C. for 30 minutes. As a result of this treatment, the white powder was converted into a yellowish powder. In a grain with a large grain diameter partially nitrided by treatment in this manner, as shown in FIG. 4($a$), the inside of the grain was titanium oxide containing no nitrogen, the outermost surface side was Ti—O—N, and the nitrogen composition ratio continuously varied along the diameter of the grain. Using this powder, the characteristics of decomposition by visible light for an aqueous methylene blue solution were determined. To about 5 cc of an aqueous 10 μM methylene blue solution in a test tube, about 0.05 g of a titanium oxide powder or a Ti—O—N powder was added and this mixture was irradiated with visible light while being stirred. The light source used was a 10 W fluorescent tube (Matsushita Electric Works, Ltd., FL10N) to the circumference of which an ultraviolet cut filter (Fujifilm, SC42) was attached and visible light with a λ approximately ≧400 nm was used. The distance to the light source was 1 cm. Ultraviolet intensity was 0.0 μW/cm$^2$ (the light-intensity meter made by TOPCON CORPORATION, UVR-2 and UD-36 were used). After irradiation for 72 hours, the solution containing the titanium oxide powder was slightly decolored, whereas the solution containing the Ti—O—N powder was decolored to be approximately colorless and transparent.

Ti—O—N phase formed by the treatment in this embodiment may cover the whole outmost surface of a grain, or may be formed on only a portion of the surface.

EXAMPLE 6

When the Ti—O—N photocatalyst of the present invention is mixed into an organic fiber and plastic, a problem occurs in that the organic fiber and plastic is decomposed by its direct contact with Ti—O—N photocatalyst. To solve this problem, it was found effective that ceramic with a lower catalytic activity be carried on the surface of the Ti—O—N photocatalyst. However, when the entire surface of the Ti—O—N is covered with ceramic, photocatalytic effects are degraded because direct contact of Ti—O—N with substances to be oxidized or reduced photocatalytically is prevented. To avoid this, the present invention can be configured such that ceramic is carried in island, needle, or mesh forms as shown in FIGS. 5(a), 5(b), and 5(c)

Example preparation of such a structure will next be described. First, a case using a hydrolysis method of metal alkoxide will be described. In hydrophobic organic solvents such as aromatic hydrocarbons such as benzene, toluene, and xylene or petroleum fraction such as kerosine and hexane to which alcohol such as methanol, ethanol, n-propanol, isopropanol, and n-butanol are added, Ti—O—N particles on the surface of which water is adsorbed are dispersed, hydrophobic organic solvents in which metal alkoxides such as alumina, silica, zirconia, magnecia, calcium, titanium are dissolved are added, and local hydrolysis of metal alkoxides is allowed to occur on said particle surface. Thereafter, by drying or sintering as necessary, ceramic with a lower catalytic activity than Ti—O—N may be formed in island, needle, or mesh shapes.

Alternatively, oxides of alumina, silica, zirconia, magnecia, calcium, and titanium or those containing nitrogen may be carried in island, needle, or mesh forms on Ti—O—N powder and film or a Ti—O—N coated substrate by the methods such as sputtering, vacuum evaporating, ionplating, and CVD.

Moreover, oxide ceramic of alumina, silica, zirconia, magnecia, calcium, and titanium and fluororesin may be carried in island, needle, or mesh forms on the titanium oxide surface by the above hydrolysis of alkoxide, sputtering, vacuum evaporating, ionplating, and CVD methods, and then by heat treatment and plasma treatment carried out in an atmosphere containing ammonia or nitrogen gases, nitrogen containing ceramic with a lower activity may be formed in island, needle, or mesh forms on the Ti—O—N surface.

In the resulting photocatalytic grain, ceramic with a lower activity as a photocatalyst is attached to the surface of a titania grain in island, needle, or mesh form. Thus, when employed with mixing into an organic fiber and plastic, it is the ceramic with a lower activity that comes in contact with the organic fiber and plastic. Then, it is possible to adsorb pollutants in the air, such as odious substances and NOx, and in the water, such as organic solvents and agricultural chemicals, such as pesticides, without decomposing the fiber and plastic themselves, and to perform continuous decomposition and removal under irradiation of not just ultraviolet light, but also under visible light with a wavelength up to about 500 nm.

Manufacturing Process

In the following, embodiments of various manufacturing processes for producing the photocatalysts of the present invention will be described.

EXAMPLE 7

In this embodiment, an example of manufacturing a photocatalytic article is shown in which a Ti—O—N thin film photocatalytic thin film is prepared on a quartz substrate by sputtering.

A quartz substrate and a titanium oxide target are set in a vacuum chamber of a sputtering device. Then, a predetermined amount of nitrogen and argon gases (for example, Ar gas, Ne gas) is introduced into the vacuum chamber and sputtering is conducted in this mixed gas plasma. As a result, a Ti—O—N film with a thickness of 10 $\mu$m or less is deposited on the quartz substrate.

The final vacuum before a sputtering gas was introduced was $2\times10^{-5}$ Pa ($1.5\times10^{-7}$ Torr). This value is an important factor when preparing the photocatalysts of the present invention in a vacuum. Comparison of visible light operation performance after depositing film at the back pressures of $9\times10^{-5}$ Pa and $4\times10^{-4}$ Pa revealed that the lower the background vacuum pressure, the greater the decrease in the Ti—N binding amount and in the activity under visible light.

During sputtering, the whole pressure may be set at, for example, 0.52 Pa and nitrogen partial pressure may be set in the range of 0%<$N_2$ partial pressure$\leq$100%, but the range of 20 to 60% is preferable. In addition, after depositing Ti—O—N film 12 by sputtering, heat treatment (annealing) is performed for crystallization. For example, crystallization can be conducted by heat treatment in a nitrogen atmosphere at 550° C. for about two hours. That is, although simple film deposition yields an amorphous structure containing polycrystals, it is possible to use heat treatment to attempt poly- and single-crystallization. In addition, although heat treatment after depositing film may also be omitted by forming Ti—O—N film with heating the quartz substrate, performance of the final film is inferior compared to films which are annealed after depositing By forming Ti—O—N film by the above method, Ti—O—N photocatalytic film can be formed by substituting nitrogen atom N for some of the oxygen sites of titanium oxide crystals.

In an experimental example, the nitrogen content in atomic percent in Ti—O—N film was 6.6% before heat treatment and 1.4% after heat treatment for film deposition by $N_2$ partial pressure 20% and 12.7% before heat treatment and 0.5% after heat treatment for film deposition by $N_2$ partial pressure 100%. In addition, for film deposition by $N_2$ partial pressure 40% and 60%, nitrogen contents after heat treatment were 1.4% and 1.5%, respectively.

Here, the state of nitrogen atom forming Ti—O—N photocatalysts manufactured by the method of this embodiment will be described in comparison with conventional titanium oxide powders. In the determination by X-ray diffraction, diffraction lines of anatase and rutile type titanium oxides were observed, but no diffraction lines derived from titanium nitride (TiN and $Ti_2N$) were observed. In addition, judging the chemical bonding state of nitrogen atoms from the determination results of the is shell of nitrogen N by XPS (X-ray Photoemission Spectroscopy) using a Mg-K$\alpha$ X-ray, as shown in FIG. 6, nitrogen atoms in Ti—O—N of this embodiment show a peak derived from Ti—N bonding near 396 to 397 eV. It can be understood from these results that nitrogen atoms are substituted for oxygen atoms of titanium oxide.

As described above, the two determination results of X-ray diffraction and XPS of the Ti—O—N photocatalysts of the present invention demonstrated that in Ti—O—N having anatase+rutile crystalline structure there is chemical bonding between Ti and N atoms.

As can be found in a powder and a film which are marketed as titanium oxide for photocatalysts, nitrogen atoms may generally be incorporated during a manufacturing process, but, as shown in FIG. 6, the peak of these nitrogen atoms appears near 400 eV. In other words, because nitrogen atoms incorporated in conventional titanium oxides form an organic compound and a nitro group, no Ti—N bonds are observed. Thus, the chemical properties of N in these substances, whether incorporated during the manufacturing process or modified on the surface by post-treatment, differ from those of the present invention.

Figure 14:
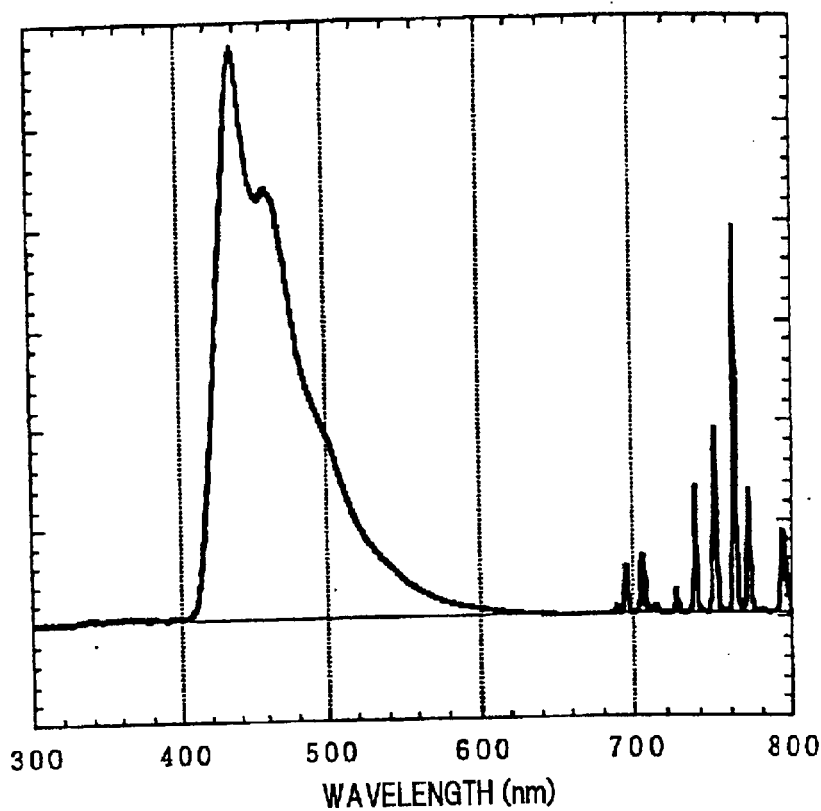
FIGS. 14(a) and 14(b) each shows a spectrum of a visible light source and associated photocatalytic activity.
Figure 14:
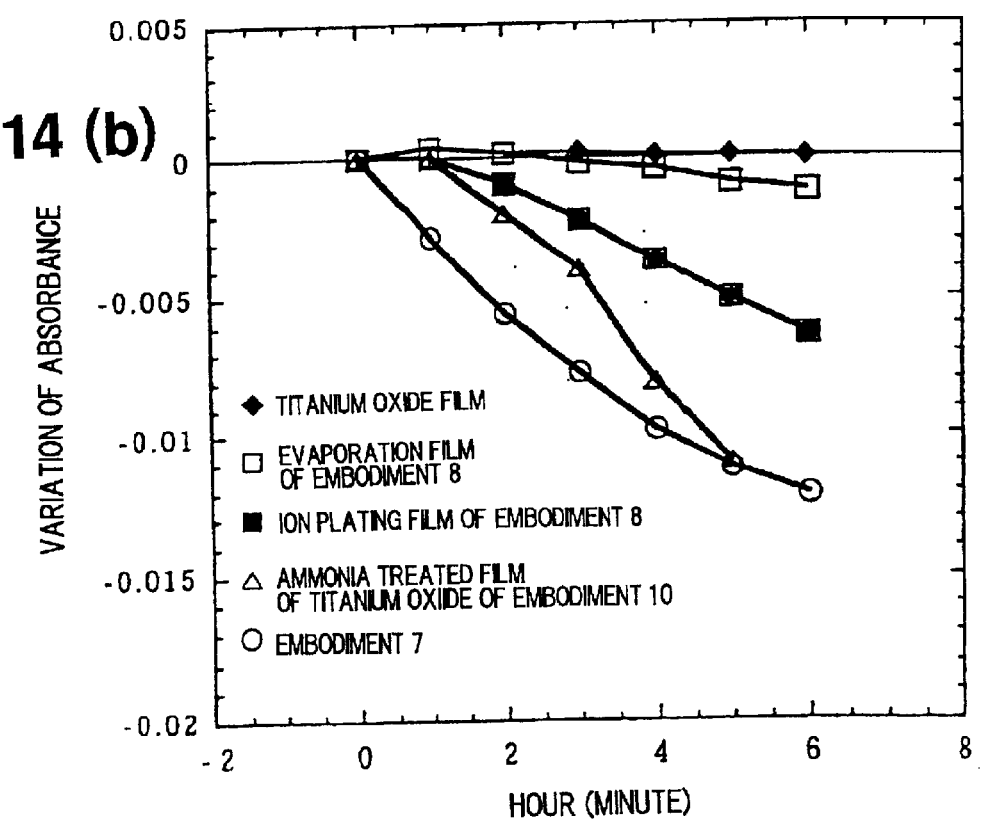

Moreover, for $Ti_{33.9}O_{64.7}N_{1.4}$ with a film thickness 160 nm produced according to Embodiment 7, the determination results of a photocatalytic activity are marked in O in FIG. 14(b). This determination was conducted by determining the methylene blue decomposition rate from light transmission by substituting a visible light source with a wavelength $\lambda \geq 410$ nm having spectra shown in FIG. 14(a) for a light source of a photocatalytic checker (manufactured by SINKU-RIKO INC.).

It is found that for the sputtering method according to Embodiment 7, the photocatalytic activity at a wavelength $\lambda > 410$ nm is markedly improved as compared to anatase type titanium oxide (expressed as a black rhombus in FIG. 14(b)) manufactured by the same method.

A photocatalytic function was exhibited in all Ti—O—N films manufactured at nitrogen gas partial pressure of 20, 40, 60, and 100%. For example, in a film of a composition ratio $Ti_{32}O_{66}N_2$, similar photocatalytic activity was shown. Therefore, it was found that the nitrogen content of Ti—O—N film may be 0<X<13 if its content in atomic % is X%. In addition, as the photocatalytic function of Ti—O—N film, that after heat treatment is superior and, as the nitrogen concentration after heat treatment, 5% or less is preferable.

Effects of ammonium salt observed by XPS at the outermost surface of the sample described above will next be described. In the embodiment in FIG. 6, a peak derived from a Ti—N bond is observed near 397 eV. In the visible light operation type photocatalysts of the present invention, a comparison between presence and absence of peak near 402 eV indicates that an activity is higher in the presence. This peak is considered to be that derived from ammonium salt and differs in bond energy from that derived from a nitro group (—$NO_2$) in conventional art.

Although Ti—O—N film was deposited above using a titanium oxide target in plasma of argon gas containing nitrogen gas, a titanium nitride target may be deposited in plasma of gas containing oxygen. In addition, as a target, titanium oxide and titanium nitride may be used, and a mixture target of titanium oxide and titanium nitride can also be used.

Moreover, as a substrate, in addition to those described above, various substances such as glass, ceramic, metal, and organic substances such as activated carbon, a plate of materials such as silica, alumina, and fluororesin, and a porous body of honeycomb structure can be utilized.

EXAMPLE 8

Titanium oxide (III) ($Ti_2O_3$) is evaporated on a glass substrate by electron beam evaporation. Then, nitrogen gas is introduced into a vacuum chamber so that the whole pressure is 0.0266 Pa (0.2 mTorr). By heat treating a manufactured film in a 100% nitrogen gas atmosphere at 500° C. for two hours, Ti—O—N film of anatase+rutile structure is manufactured. XPS analysis of this film confirmed a bond between Ti and N atoms and the results of X-ray diffraction demonstrated neither TiN nor $Ti_2N$ crystals. TiO—N photocatalysts formed have either one or a combination of nitrogen atoms substituted for some oxygen sites of titanium oxide crystals, doped at interstitial sites of lattices of a titanium oxide crystal, and doped to grain boundaries of titanium oxide.

Furthermore, evaporating materials may be not only titanium oxide (III) as described above, but also titanium oxide and metal titanium of different composition ratios. In addition, as a substrate, in addition to that described above, various substances such as glass, ceramic, metal, and organic substances such as activated carbon, a plate of materials such as silica and a porous body of honeycomb structure can be utilized.

Moreover, the atmosphere at evaporation may be a mixed atmosphere of nitrogen and oxygen gases. In such a case, because the higher the oxygen gas partial pressure, the more difficult for nitrogen atoms to enter a film, the nitrogen composition ratio in the film becomes lower. Therefore, heat treatment with ammonia gas is effective. Treatment temperature at that time may be in the temperature range between 400 and 700° C. Treatment at temperatures exceeding this range is undesirable because titanium nitride is formed. In addition, Ti—O—N photocatalytic film with high adhesion to a base material may be formed by using the ion plating method in which a plasma state is made in a vacuum atmosphere at evaporation and in which evaporated grains are ionized and activated as excited grains, the arc ion plating method, and electron beam excited plasma. In addition, also by the cluster ion beam method, it can be manufactured by selecting a condition.

Moreover, by depositing in an oxygen atmosphere, a titanium oxide film is formed. When this is heat treated in an atmosphere containing ammonia gas or both nitrogen and hydrogen in the temperature range from 400 to 700° C. a Ti—O—N photocatalyst is produced.

EXAMPLE 9

In this embodiment, an example of manufacturing by a sol gel method using alkoxide will be described. A titania sol is prepared by suspending titanium oxide of an ultra fine grain in water and by hydrolyzing alkoxide of titanium obtained by the reaction of alcohol with titanium tetrachloride and metal titanium. Then, addition of alcohol amines such as monoethanolamine and diethanolamine, triethanolamine, N-methyldiethanolamine, N-ethyl diethanolamine, N,N-dimethyldiaminoethanol, and diisopropanolamine, and glycols such as diethylglycol produces a uniform transparent titania sol.

Ti—O—N photocatalytic film exhibiting a photocatalytic activity not only under irradiation of ultraviolet light, but also under visible light can be manufactured by coating these titania sols by dropping, application, and spray methods and by heat treating in an atmosphere containing ammonia or nitrogen. Preferable treatment temperatures are in the range from 300 to 800° C., and more preferably between 450 and 700° C.

EXAMPLE 10

In this embodiment, a method of coating the surface of a carrier with Ti—O—N by treating in a gas will be shown. By immersing a honeycomb structure body in a solution in which a titanium oxide grain is dispersed and suspended, the surface of the structure body is coated with the above titanium oxide dispersion solution. By then heat treating the structure in an atmosphere containing ammonia gas or nitrogen at 550° C., the solution portion is evaporated, and Ti—O—N is formed on the surface of the honeycomb structure body. Heat treatment temperatures may be within a range between, for example, 450° C. and 700° C.

Moreover, in the case that a mixed gas of ammonia gas and an inert gas such as argon gas is used as a reaction gas, the temperature range for forming the Ti—O—N phase of the present invention without forming titanium nitride can be broadened, and reproducibility of manufacture can be improved. In addition, gas handling is simplified and made more convenient. Still further, by subjecting the structure to preliminary heat treatment before subsequent heat treatment in an atmosphere containing ammonia gas or nitrogen, adhesion of the honeycomb structure body to a photocatalytic grain is improved.

Figure 15:
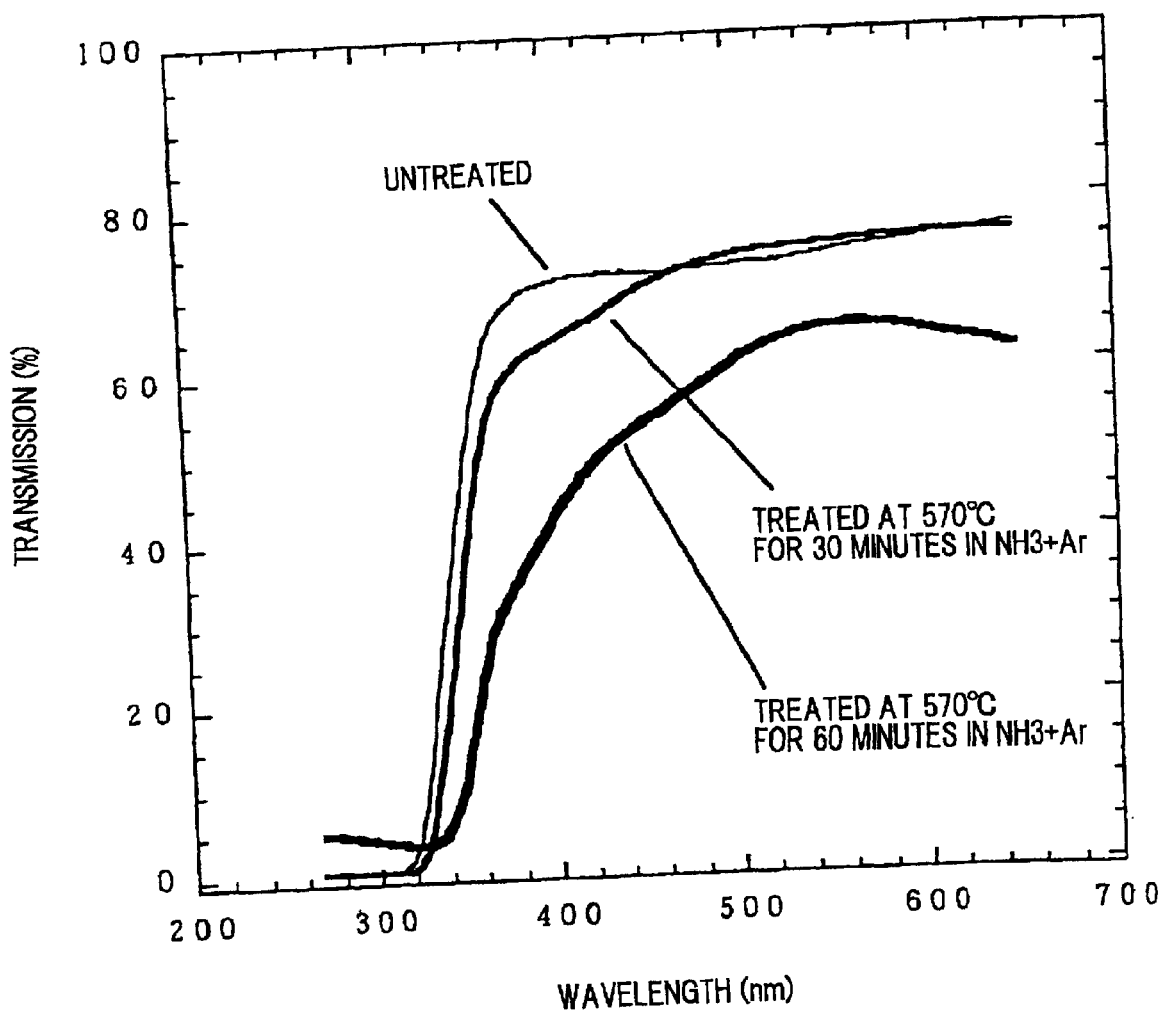
FIG. 15 shows light absorption spectra of the photocatalytic materials according to an Embodiment 10 of the present invention.

FIG. 15 shows the light transmission spectra for Ti—O—N in a film form manufactured on a glass plate by heat treating as described in a mixed gas (nitrogen+argon) atmosphere. Because visible light transmission decreases as treatment time is lengthened from 30 to 60 minutes, it can be judged that visible light absorbing performance is improved by heat treatment in an ammonia atmosphere.

Figure 16:
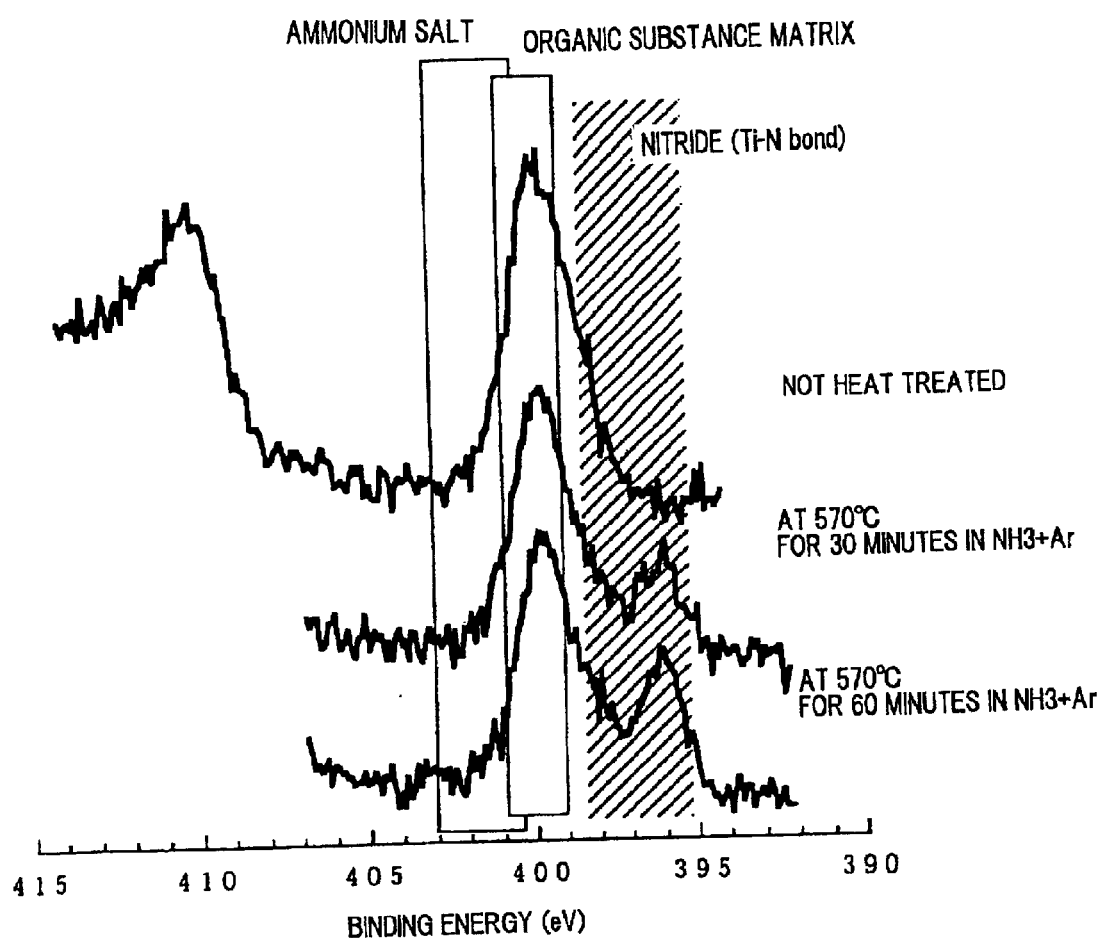
FIG. 16 shows the binding energy spectrum (XPS spectrum) of the 1s shell of a nitrogen atom in a photocatalytic material of Embodiment 10.

FIG. 16 shows analysis results by XPS for tests performed on films prepared as described above. Peaks derived from a Ti—N bond are observed near 396 to 397 eV. Because no diffraction line derived from titanium nitride (TiN) crystals is observed in X-ray diffraction, it was found that a photocatalytic substance is formed in which nitrogen is contained in titanium oxide crystals by substituting nitrogen atoms for some of the oxygen sites of titanium oxide crystals with the treatment of this embodiment.

Moreover, the composition ratio analyzed by XPS was $Ti_{34}O_{65}N_1$ in all treatment conditions.

Here, a sol for coating the surface of the honeycomb structure body with Ti—O—N may be titanium alkoxide usually employed for forming a titania film. A solution of titanium chloride and organic titanium compound may also be employed. In addition, an aqueous solution in which hydrochloric acid and ethanol are dissolved is mixed in a solution of titanium isopropoxide in ethanol. When this mixed solution is stirred at a temperature of 40 to 50° C., a sol is formed, which may be employed.

Furthermore, Ti—O—N photocatalyst may be formed using a glass fiber, zeolite, a FSM porous body, activated carbon, a fiber or the like instead of the honeycomb structure body.

EXAMPLE 11

Titanium oxide grains with a grain diameter of about 10 nm are set in a chamber, which is evacuated to below $1.33 \times 10^{-3}$ Pa ($1 \times 10^{-5}$ Torr). Subsequently, nitrogen gas, for example 0.399 Pa (3 mTorr), is introduced into the chamber and high frequency plasma is produced with 200 W electric power. Ti—O—N photocatalyst can be manufactured by conducting this high frequency nitrogen plasma irradiation for 30 minutes. In addition, a gas producing plasma may not be limited to nitrogen gas and the use of a mixed gas nitrogen gas and an inert gas or that of nitrogen gas and hydrogen gas further improves the effect. The electric power employed during manufacture is not limited to a 200 W power, and would, in fact, normally vary according to device size. In addition, the above titanium oxide may be in the form of a film or fiber instead of a grain. Low temperature plasma such as ECR plasma or heat plasma of any nature may also be employed as the plasma, which can also be realized by techniques such as microwave plasma CVD. However, photocatalytic performance is inferior when plasma treatment is performed at room temperature.

EXAMPLE 12

This embodiment illustrates a manufacturing example by ion-implantation. More specifically, using an ion implantation device, nitrogen ions are accelerated to energy between 30 keV and 500 keV and applied to titanium oxide. Here, it is desirable that most implanted nitrogen ions be distributed from the surface of titanium oxide to the depth of about 300 Å from the surface. As implantation energy, between 50 keV and 400 keV is preferable, and between 100 keV and 200 keV is more preferable.

The ion implantation device which may be employed is not uniquely limited. A commercial device employed for doping impurities in a semiconductor field may be used. However, a device in which implantation energy and amount can be set to desired values is preferable.

It is desirable that implantation amounts of ions implanted in titanium oxide are between $1 \times 10^{14}$ and $1 \times 10^{19}$ ions per 1 $cm^2$ of irradiation area, with amounts between $1 \times 10^{16}$ and $1 \times 10^{17}$ being especially preferable. If the introduction amount of an ion is too little, the effect of exhibiting a photocatalytic activity by absorbing light in the visible light region is lowered. Conversely, if the introduction amount of an ion is too great, an activity can be undesirably reduced.

It is desirable that Ti—O—N after ion implantation is treated by annealing. By performing annealing treatment, a photocatalytic activity is further improved. The method of annealing treatment is not specially limited. Generally, annealing is performed using an electric furnace in the air. The temperature of annealing treatment is usually 200° C. or more and 700° C. or less, preferably 300° C. or more and 500° C. or less. The time for annealing treatment is also not especially limited and can be selected as appropriate, with one to six hours being commonly chosen periods.

EXAMPLE 13

Figure 17:
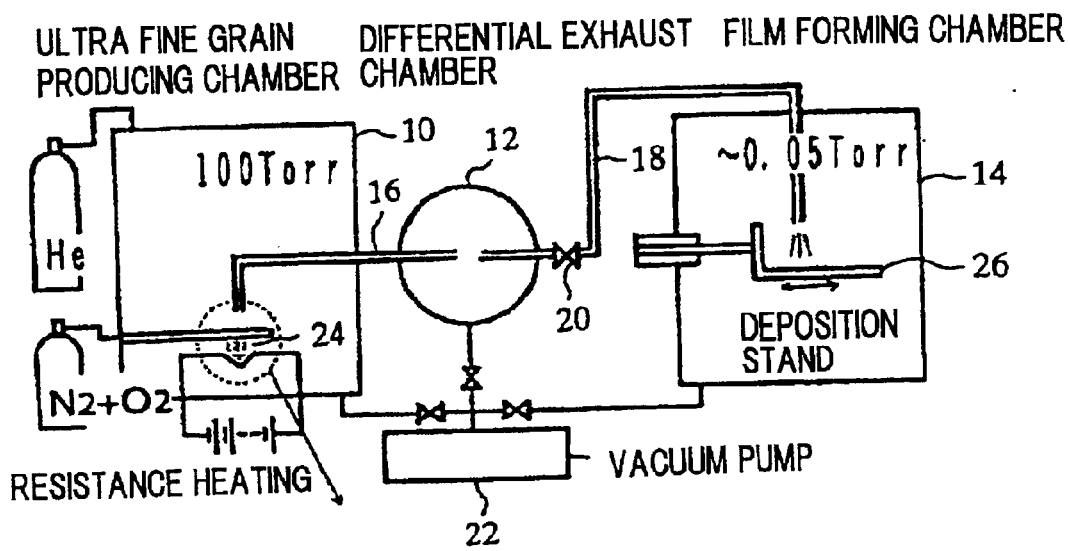
FIG. 17 shows the constitution of an ultra fine grain film producing equipment in an Embodiment 13 according to the present invention.

This embodiment illustrates an example of preparation of an ultra fine grain photocatalytic Ti—O—N film. A manufacturing device is shown in FIG. 17. This device comprises an ultra fine grain producing chamber 10, a differential exhaust chamber 12, and a film forming chamber 14, wherein the ultra fine grain producing chamber 10 is connected by a tube 16 to the differential exhaust chamber 12 and the differential exhaust chamber 12 is connected by a tube 18 having a valve 20 to the film forming chamber 14. In addition, a vacuum pump 22 is connected through each valve to the ultra fine grain producing chamber 10, the differential exhaust chamber 12, and the film forming chamber 14. Further, the ultra fine grain producing chamber 10 is provided with a composite EC boat 24 in which resistance heating is possible and in addition, is so designed that helium gas and a nitrogen+oxygen mixed gas may be introduced into it. In addition, the film forming chamber 14 is provided with a depositing base 26.

First, the ultra fine grain producing chamber 10, the differential exhaust chamber 12, and the film forming chamber 14 are all evacuated to about $10^{-4}$ Pa ($10^{-6}$ Torr). Thereafter, thee gas is introduced into the ultra fine grain producing chamber 10 to the extent of 13.3 kPa (100 Torr). Then, through a nitrogen gas exhaust nozzle within the ultra fine grain producing chamber 10, a predetermined flow of a nitrogen+oxygen mixed gas begins to flow. Subsequently, an electric current is applied to the composite EC boat 24 and is so controlled that metal titanium on the boat 24 reaches a predetermined evaporation temperature. Evaporated Ti reacts with oxygen as well as nitrogen to form Ti—O—N. The flow ratio of reaction gas at this time is nitrogen: oxygen=99.99:0.01 to 90:10.

When grains are being deposited, by opening the valve 20 for flow from the differential exhaust chamber 12 to the film forming chamber 14, gas mixed with Ti—O—N grains is run into the ultra fine grain producing chamber 10 at a flow of He gas 200 ml/min. In the film forming chamber 14, glass, ceramic, metal, and organic substances such as activated carbon, a plate of materials such as silica, and a porous body of honeycomb structure are mounted on the depositing base 26 and by moving this depositing base 26 at a predetermined rate, gas mixed with ultra fine grain is sprayed to form an ultra fine grain film.

Moreover, although metal titanium is described as an evaporation material, titanium nitride and oxide may also be used for an evaporation material.

Furthermore, the photocatalyst grains of the present invention can also be manufactured by other methods including physical techniques such as metallic vapor synthetic and fluidized oily vacuum evaporation methods, chemical methods in the liquid phase such as colloid and alkoxide methods, and chemical methods in the gaseous phase such as a heat decomposition method of organic metal compounds and a method of reducing titanium chloride, oxide and hydrous oxide, acid nitride, and nitride in gas containing ammonia or nitrogen.

EXAMPLE 14

This embodiment shows a method of manufacturing a Ti—O—N photocatalytic powder with a large specific surface area using an emulsion combustion method. The manufacturing method of the present invention comprises spraying either one or both of emulsions in which substances containing titanium or both titanium and nitrogen atoms, or a suspension in which both substances containing titanium and those containing nitrogen atoms are suspended in a flammable liquid, or an emulsion in which a solution of the above substance is emulsified in a flammable liquid and heating said suspension or emulsion in an atmosphere of one or more of nitrogen and ammonia gas.

These substances may be a metal, a metal salt, or the like, including chlorides and complex salts of titanium or the like. That is, substances containing titanium atom with which the above suspension and emulsion may be prepared may be used as a raw material regardless of their form. In addition, titanium alkoxide may be used.

Moreover, a suspension may be prepared by suspending substances containing titanium or both titanium and nitrogen atoms or both substances containing titanium and those containing nitrogen atoms in a flammable liquid. An emulsion may be prepared by emulsifying in a flammable liquid substances containing titanium or both titanium and nitrogen atoms or a solution of both substances containing titanium and those containing nitrogen atoms in a solvent. Thus, even substances which are not always soluble in a solvent can be used as a raw material for manufacturing a photocatalytic powder by suspension in a flammable liquid.

Furthermore, for a suspension, as a form of a substance suspended in a flammable liquid, many forms, such as a grain form may be employed, but the finer the form, the finer will be the obtained powder. In addition, for an emulsion, as a solvent for dissolving substances containing titanium or both titanium and nitrogen atoms or both those containing titanium and those containing nitrogen atoms, water is desirable.

Flammable liquids which may be used as a medium for suspension or emulsion include, alone or in combination, kerosene, gasoline or the like.

Because mixing is performed in a liquid state when preparing a suspension or an emulsion, said suspension or emulsion is homogenous and, because no temperature distribution occurs because of this homogeneity when a nitrogen oxide is manufactured and when a suspension or an emulsion is sprayed and heated, the homogeneity of composition is not impaired.

Moreover, when emulsifying in a flammable liquid substances containing titanium or both titanium and nitrogen atoms or a solution of substances containing titanium and substances containing nitrogen atoms, addition of an emulsifier or stirring with a homomixer or the like is preferable. Emulsifiers containing no metal ion are preferable, and, in particular, nonionic surface active agents are preferable.

By employing an appropriate emulsifier when preparing an emulsion, a suspension in which spherical particles with an approximately homogenous diameter are dispersed is obtained. The homogeneity of the diameter of this dispersion particle is reflected in the grain diameter of the resulting photocatalytic powder. Because preparation of an emulsion with a homogenous dispersion particle diameter is a relatively simple task, an oxide powder composed of particles with a homogenous grain diameter can be readily manufactured. Production of an oxide powder with a more homogenous grain diameter is further simplified because there is no coagulation of sprayed grains.

Employable methods of spraying a suspension or an emulsion include spraying a suspension using a compressed air sprayer or spraying an emulsion using a quantitative pump or the like. Generally, increasing spray capacity will improve production efficiency, but, because a combustion temperature may become too high, there may be an upper limit to spray capacity.

In the present embodiment, a suspension or an emulsion is sprayed and said suspension or emulsion is heated in an atmosphere of either one or a combination of nitrogen and ammonia gas. A flammable liquid in a suspension or an emulsion is thereby combusted.

In heating methods, spray liquid drops are heated with a burner or the like or are passed through a flame or a substance heated to a high temperature. As an atmosphere when heating, either one or a combination of nitrogen and ammonia gas is necessary.

Manufactured photocatalytic powder is collected so that it does not scatter. In this way, a powder is manufactured. Because of the absence of conventional calcining and crushing processes, the method according to this embodiment enables the present invention to be performed in few processes without mixed impurities.

In an experimental test of the method of this embodiment, when as an initial material, $TiCl_4$ and $NH_4Cl$ were used as Ti and N sources, respectively, the N composition ratio in the Ti—O—N photocatalyst was 4.5% and, after heat treating at 500° C. in an air atmosphere later, the N composition ratio was 2.1%. When heat treating was performed at 800° C. in air, the N composition ratio was 1.4%. Although the crystalline phase of two of the former is anatase and that of the latter was rutile, all exhibited a photocatalytic activity in the visible light region.

In a further test using, as an initial material, $TiCl_4$ as a Ti source in which ammonia gas was introduced instead of soaking NH4+ions in liquid as a N source, a photocatalytic article was obtained in which the N composition ratio in Ti—O—N catalyst was 0.9%.

EXAMPLE 15

Methods of hydrolyzing titanium compounds such as titania sulfate, titanium sulfate, titanium chloride, and organic titanium compounds in the presence, if required, of a crystalline seed by adding ammonium salt and aqueous ammonia solution; or neutralizing by adding ammonium salt and/or aqueous ammonia solution to titanium compounds such as titanil sulfate, titanium sulfate, titanium chloride, and organic titanium compounds in the presence of a crystalline seed; or conducting hydrothermal treatment of a titanium oxide suspension by adding ammonium salt and/or aqueous ammonia solution, are all known. For aqueous solutions, it may be preferable that said hydrolysis of titanium compounds be conducted at temperatures up to their boiling point.

Although the products obtained by said methods can be used as Ti—O—N catalyst, as needed, said products may be separated, washed, and then dried or calcined. Separation can be performed by the methods such as ordinary filtration and a gradient method. Although drying can be performed at a given temperature, temperatures of 100 to 200° C. are suitable. For the calcination temperatures, temperatures of 200 to 500° C. are suitable.

EXAMPLE 16

As a method for producing the photocatalyst of the present invention, the oxidizing of titanium nitride or acid titanium nitride is also effective. Here, an example of oxidizing a titanium nitride powder in an oxygen atmosphere will be described.

A titanium nitride powder (made by KOJUNDO CHEMICAL, mean primary grain diameter 33 nm) was placed in a silica tube and was heat treated at 400° C. for 90 minutes in an oxygen atmosphere. As a result, a yellow sintered body was formed. A yellow fine powder was prepared by crushing this body in a mortar. From X-ray diffraction analysis of this powder strong (110), (101), (200), (111), (210), (211), and (220) diffraction lines of rutile type titanium oxide and a very weak TiN (200) diffraction line were observed. The mean primary grain diameter of rutile titanium oxide estimated from the half-value width of a (110) diffraction line was 42 nm. In addition, XPS clarified that there was also a Ti—N chemical bond in the powder.

Figure 18:
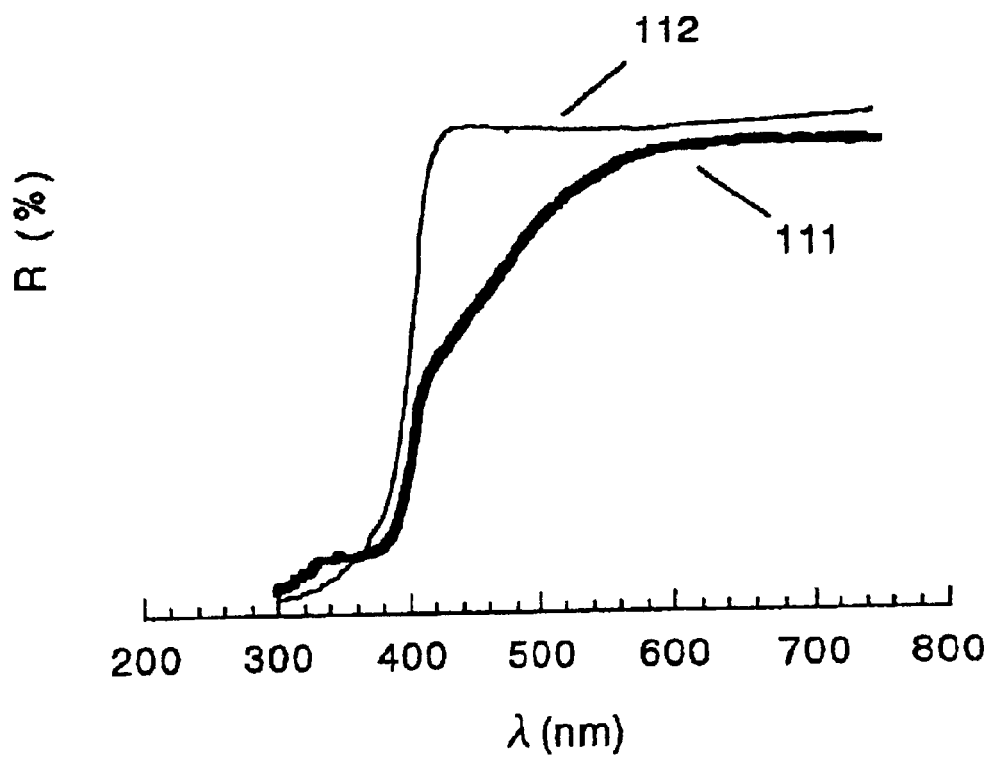
FIG. 18 shows the light reflection spectra in Embodiment 16 according to the present invention.

FIG. 18 shows the diffuse reflectance spectrum of the powder. The curve labeled mark 111 in the figure is the reflectance spectrum for the photocatalytic powder of this embodiment and that expressed as the mark 112 is the reflectance spectrum for rutile type titanium oxide with mean primary grain diameter 19 nm. From this result it can be understood that the Ti—O—N of this embodiment, in which a light absorption edge is shifted to the longer wavelength side than in ordinary rutile type titanium oxide, absorbs visible light.

Using this powder, decomposition of an aqueous methylene blue solution when irradiated with visible light was performed. About 0.05 g of the powder was added to about 5 cc of an aqueous 10 $\mu$M methylene blue solution and this mixture was irradiated with visible light while stirring. The light source used was a 10 W fluorescent tube (Matsushita Electric Works, Ltd. FL10N) to which an ultraviolet cut filter (Fuji Photo Film Co., Ltd., SC42) was attached so that visible light with a wavelength $\lambda \geq$ approximately 400 nm was irradiated. The distance to the light source was 1 cm. Ultraviolet intensity was 0.0 $\mu$W/cm$^2$ (the light-intensity meter made by Topcon, UVR-2 and UD-36 were used). After irradiation for 48 hours, the solution was decolored to be transparent and nearly colorless.

This test showed that a Ti—O—N photocatalyst can be easily formed from a material having a Ti—N bond. In addition, by selecting treatment conditions, a photocatalytic article having the structure of Ti—O—N within a powder and titanium oxide on the outermost surface can be formed.

Using this method, also when treating at 550° C., a rutile type visible light catalyst powder was similarly obtained. In addition to this method, when an oxidation atmosphere is employed as a treatment atmosphere, similar effects may be obtained with any atmosphere such as atmospheres containing oxygen gas, ozone, water molecule, and a hydroxyl group, which all may be employed. In addition, the photocatalytic article of the present invention can be similarly prepared also by the emulsion combustion method in an oxidation atmosphere. With any of these methods, a photocatalytic article having the structure of Ti—O—N within a powder and titanium oxide on the outermost surface can be formed by appropriately selecting treatment conditions.

Performance of Photocatalysts

FIG. 14(b) shows the decomposition performance of methylene blue when irradiated with visible light with a wavelength $\lambda$>410 nm shown in FIG. 14(a) for a photocatalytic article of film structure according to the above embodiment. Representative samples are from embodiments which can readily produce a film, and the experimental results for these are shown. Specifically, experimental results for a Ti—O—N film prepared by sputtering in the Embodiment 7 explained above, an evaporation film according to Embodiment 8, an ion plating film according to Embodiment 9, and an ammonia treated film of titanium oxide according to Embodiment 10 are expresses as ○, □, ■, and Δ in the figure, respectively. Additionally, as a comparative example, the characteristics of the titanium oxide film are also expressed as ♦. It is clear from these results that the photocatalyst, and the manufacturing process, of the present invention realizes a photocatalyst exhibiting a high activity when irradiated with visible light, as well as ultraviolet light.

Figure 19:
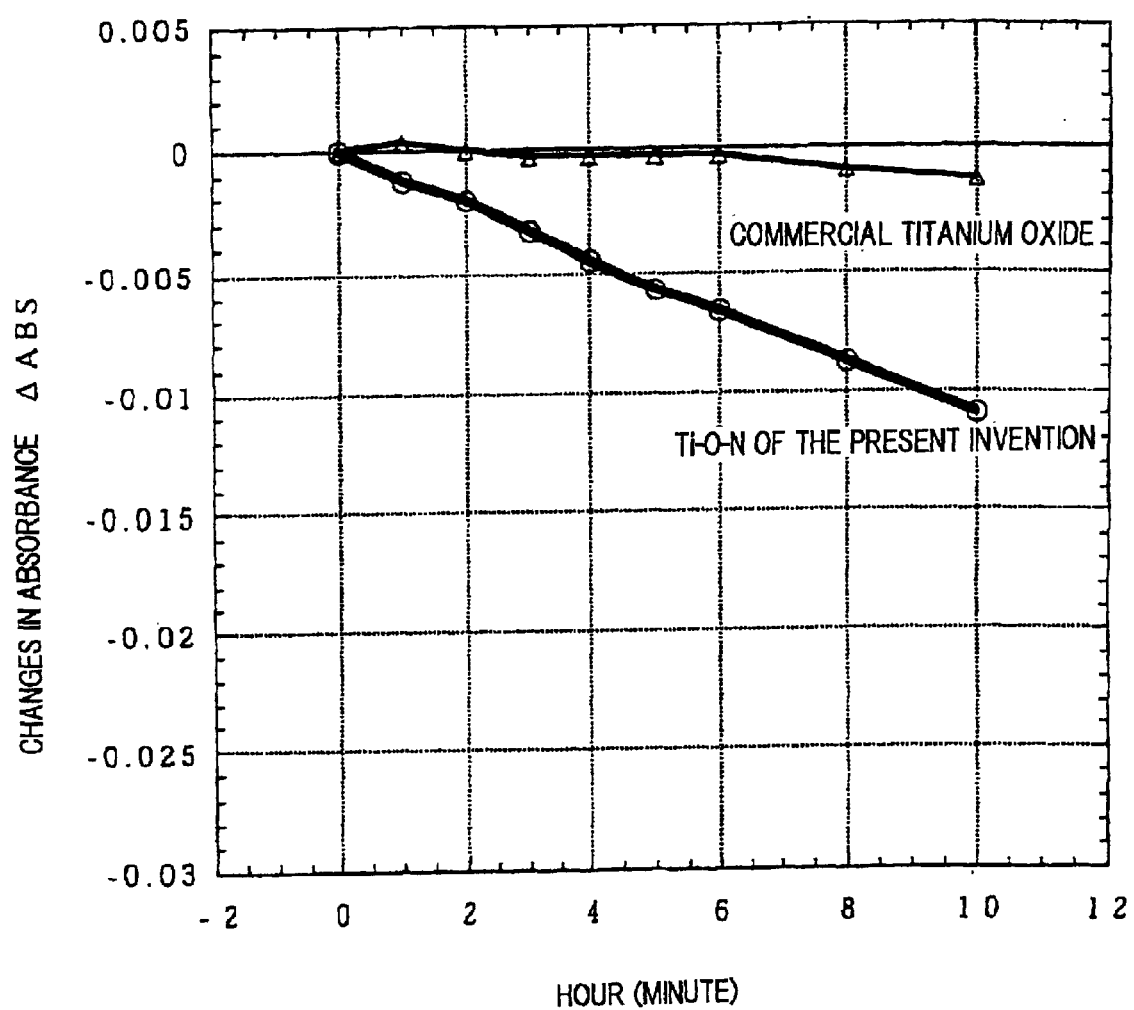
FIG. 19 shows the photocatalytic activity under fluorescent light of a photocatalytic material according to Embodiment 1 of the present invention.

FIG. 19 shows experimental results when a photocatalytic thin film according to Embodiment 1 was evaluated under daylight fluorescent lighting. Light was irradiated from a position 15 mm away from a fluorescent tube with brightness 2000 cd/m$^2$. The photocatalyst of the present invention exhibited strong photocatalytic activity even under white fluorescent lighting. Because white fluorescent lighting has extremely low content of ultraviolet radiation compared with solar lighting, conventional titanium oxide photocatalysts do not exhibit photocatalytic performance in a normal indoor dwelling environment. In contrast, it is found that the photocatalysts of the present invention exhibit sufficient or superior effects even in such an indoor environment.

Exemplary Modifications

Furthermore, for the Ti—O—N crystal system of the present invention, it is undesirable that titanium nitride TiN crystals be formed inside a material. The Ti—O—N with which the present invention is concerned, as described above, is obtainable by either one or a combination of doping nitrogen atoms at the interstitial sites of lattices of a titanium oxide crystal, doping nitrogen atoms to grain boundaries of titanium oxide, and, more preferably, substituting nitrogen atoms for some of the oxygen sites of titanium oxide crystals and consequently only diffraction lines of titanium oxide appear in the analysis by the X-ray diffraction method. In general, although for titanium oxide photocatalysts produced by conventional art, those of anatase type are desirable because of their high activity, for the photocatalysts of the present invention, any crystal systems of anatase, rutile, and brookite may be employed as their basic crystal.

Moreover, although for the processes in the above embodiments, Ti—O—N photocatalysts were used as illustrative examples, the subject of these processes is not limited to Ti—O—N, and they can also be applied to material systems in which at least one of S, B, C, P, Cl, As, Se, Br, Sb, Te, and I is further doped to Ti—O—N.

Furthermore, the photocatalysts of the present invention can also be used as a reduction catalyst. In addition, the photocatalysts can be also employed as catalysts for synthesizing other substances from a given raw material.

As noted above, the photocatalysts of the present invention react when exposed to visible light. Hence, one can effect antifogging and organic substance removal by forming on the surface of various materials subjected to a condition in which visible light is irradiated.

Having described the present invention, it will now be apparent to one of ordinary skill in the art that many changes and modifications may be made to the above-described embodiments without departing from the spirit and the scope of the present invention.

What is claimed:

1. A photocatalytic material, which exhibits photocatalytic activity when exposed to light comprising a wavelength in a region of visible light, said material comprising Ti—O—N containing nitrogen in lattices of titanium oxide crystal, wherein a chemical bond exists between a nitrogen atom present in the titanium oxide crystal and a titanium atom and which has an impurity level caused by substituting a nitrogen atom for an oxygen site of titanium oxide between a band gap of a valence band and a conduction band of titanium oxide.

2. The photocatalytic material of claim 1, wherein a X-ray photoemission spectroscopy spectrum exhibits a peak derived from ammonium salt.

3. The photocatalytic material of claim 1, wherein a crystal face of a photocatalytic article or a film is oriented along a C axis direction on its surface.

4. The photocatalytic material of claim 1, having the empirical formula $Ti_{33.9}O_{64.7}N_{1.4}$.

5. The photocatalytic material of claim 1, having the empirical formula $Ti_{34}O_{65}N_1$.

6. The photocatalytic material of claim 1, having the empirical formula $Ti_{31}O_{67}N_2$.

7. A photocatalyst, comprising the photocatalytic material of claim 1 wherein an external surface of the photocatalyst comprises titanium oxide containing no nitrogen.

8. A photocatalyst, comprising as an inner component at least one of titanium oxide, silica, alumina, fluororesin, or those containing nitrogen, and as an external component on a whole or some portion of an external surface, the photocatalytic material of claim 1.

9. A photocatalyst, wherein at least one of titanium oxide, silica, alumina, fluororesin or those containing nitrogen is mixed with the photocatalytic material of claim 1.

10. A photocatalytic article, comprising the photocatalytic material of claim 1, wherein a surface of the photocatalytic material comprises a ceramic with a lower photocatalytic activity than said photocatalytic material, which ceramic is carried in an island, needle, or mesh form.

11. The photocatalytic article of claim 10, wherein the ceramic with a lower photocatalytic activity than said photocatalyst is at least one selected from the group consisting of alumina, silica, zirconia, magnecia, calcia, calcium phosphate, amorphous titanium oxide, and fluororesin.

12. The photocatalytic article of claim 10, wherein the ceramic with a lower photocatalytic activity than said photocatalytic material is at least one selected from alumina, silica, zirconia, magnecia, calcia, potassium phosphate, amorphous titanium oxide, and fluororesin which contains nitrogen.

13. The photocatalytic article of claim 10, wherein the ceramic is in an island form.

14. The photocatalytic article of claim 10, wherein the ceramic is in a needle form.

15. The photocatalytic article of claim 10, wherein the ceramic is in a mesh form.

16. A method of manufacturing a photocatalytic article, which comprises forming a thin film of the photocatalytic material of claim 1, on a substrate by sputtering at least one of titanium-oxynitride, titanium oxide, titanium nitride, or titanium metal as a target material in an atmosphere containing nitrogen gas.

17. A method of manufacturing a photocatalytic article, which comprises forming a thin film of the photocatalytic material of claim 1, on a substrate by vaporizing or ion plating at least one of titanium-oxynitride, titanium oxide, titanium nitride, or titanium metal as a target material in an atmosphere containing nitrogen gas.

18. A method of manufacturing a photocatalytic article, which comprises forming the photocatalytic material of claim 1, by heat-treating titanium oxide or hydrated titanium oxide in an atmosphere containing ammonia gas, nitrogen gas, or mixture of nitrogen and hydrogen gases.

19. A method of manufacturing a photocatalytic article, which comprises forming the photocatalytic material of claim 1, by heat-treating a titanium alkoxide solution in an atmosphere containing ammonia gas, nitrogen gas, or mixture of nitrogen and hydrogen gases.

20. A method of manufacturing a photocatalytic article, which comprises forming the photocatalytic material of claim 1, by treating titanium oxide in plasma containing nitrogen atom.

21. A method of manufacturing a photocatalytic material, which comprises forming the photocatalytic material of claim 1, by implanting nitrogen atom in titanium oxide by ion-implantation.

22. A method of manufacturing a photocatalytic article, which comprises forming the photocatalytic material of claim 1, by vacuum evaporating at least one of titanium-oxynitride, titanium oxide, titanium nitride, and metal titanium used as an evaporating material in an atmosphere containing nitrogen gas, and then transferring it to a different vacuum vessel using differential pressure.

23. An emulsion combustion method of manufacturing the photocatalytic material of claim 1, comprising spray combusting an emulsion in the atmosphere such that ions or molecules containing nitrogen elements other than nitrate ion are present in an aqueous solution or suspension of metallic salts which is an aqueous phase in an emulsion, wherein an amount of oxygen introduced into a reactor is less than that required for producing the oxides of metallic ions or metal compounds which are in most stable forms in the air, keeping the sufficient amount of oxygen to burn the oil and surfactant completely.

24. A method of manufacturing the photocatalytic material of claim 1, comprising, in an emulsion combustion method, spray combusting an emulsion in the atmosphere in which a nitrogen containing gas, excluding nitrogen gas, is contained in an aqueous solution or suspension of metallic salts which is the aqueous phase in an emulsion and in which the amount of oxygen introduced into a reactor is less than that required for complete oxidation.

25. A method of manufacturing the photocatalytic material of claim 1, which comprises mixing titanium oxide and titanium nitride, to form a mixture and heat-treating the mixture at a temperature between about 400 and 700° C.

26. A method of manufacturing the photocatalytic material of claim 1, which comprises heat-treating or plasma-treating titanium nitride or titanium-oxynitride in an oxidation atmosphere containing oxygen, ozone, a water molecule, or a hydroxyl group.

27. A method of decomposing an organic compound, which comprises contacting the organic compound with the photocatalytic material of claim 1, in the presence of light having a wave length (λ) of greater than 200 μm.

28. The method of claim 27, wherein said light has an intensity of about 5 mW/cm² or greater.

29. The method of claim 27, wherein said photocatalytic material is present in a form of a film and said organic compound is decomposed at a surface of said film.

30. The method of claim 27, wherein said light has a wavelength of greater than 400 μm.

31. The method of claim 30, wherein said light has a wavelength of up to about 500 μm.

32. The method of claim 27, wherein said organic compound decomposed is an organic solvent.

33. The method of claim 27, wherein said organic compound decomposed is an agricultural chemical.

34. The method of claim 27, which is effected indoors.

35. A method of decomposing air pollutants, comprising contacting said air pollutants with the photocatalytic material of claim 1, in the presence of light having a wavelength (λ) of greater than 200 μm.

36. The method of claim 35, wherein said air pollutants comprise nitrogen oxides.

37. The method of claim 36, wherein light has an intensity of about 5 mW/cm² or greater.

38. The method of claim 35, wherein said photocatalytic material is present in a form of a film, and said organic compound is decomposed at a surface of said film.

39. The method of claim 35, wherein said light has a wavelength of greater than 400 μm.

40. The method of claim 39, wherein said light has a wavelength of up to about 500 μm.

41. A photocatalyst, comprising the photocatalytic material of claim 1, in a carrier.

42. The photocatalyst of claim 41, wherein said carrier is glass.

43. The photocatalyst of claim 41, wherein said carrier is zeolite.

44. The photocatalyst of claim 41, wherein said carrier is activated carbon.

45. The photocatalytic material of claim 1, wherein a nitrogen atom of said Ti—O—N is contained in lattices of said titanium oxide crystal by at least one process comprising substituting a nitrogen atom for an oxygen site of said titanium oxide crystal, doping a nitrogen atom at an interstitial site of lattices of said titanium oxide crystal, or doping a nitrogen atom between grain boundaries of said titanium oxide crystal.

46. The photocatalytic material of claim 1, wherein the nitrogen atom is substituted for an oxygen site of the titanium oxide crystal.

47. The photocatalytic material of claim 1, wherein a N1s shell bond energy spectrum of the photocatalytic material exhibits at least one peak in about the 400 eV or less region, when measured using X-ray photoemission spectroscopy.

48. The photocatalytic material of claim 1, wherein a N1s shell bond energy spectrum of the photocatalytic material exhibits at least one peak in the region between about 396 eV and 398 eV, when measured using X-ray photoemission spectroscopy.

49. A photocatalytic material, which exhibits photocatalytic activity when exposed to light comprising a wavelength in a region of visible light, said material comprising Ti—O—N containing nitrogen in lattices of titanium oxide crystal, wherein a chemical bond exists between a nitrogen atom present in the titanium oxide crystal and a titanium atom and wherein nitrogen content X expressed in atomic % is 0<X<13%.

50. A photocatalytic material, which exhibits photocatalytic activity when exposed to light comprising a wavelength in a region of visible light, said material comprising Ti—O—N containing nitrogen in lattices of titanium oxide crystal, wherein a chemical bond exists between a nitrogen atom present in the titanium oxide crystal and a titanium atom and wherein atomic % values Y, Z, and X for titanium, oxygen, and nitrogen satisfy the expression, $0.4<Y/(X+Z)<0.6$.

* * * * *